(12) United States Patent
Takiguchi et al.

(10) Patent No.: US 8,773,471 B2
(45) Date of Patent: Jul. 8, 2014

(54) CONTENT MANAGING DEVICE AND CONTENT MANAGING METHOD

(75) Inventors: Hideo Takiguchi, Kawasaki (JP); Katsutoshi Nagato, Tachikawa (JP); Michiko Nagano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 637 days.

(21) Appl. No.: 12/993,362

(22) PCT Filed: May 11, 2009

(86) PCT No.: PCT/JP2009/002045
§ 371 (c)(1),
(2), (4) Date: Nov. 18, 2010

(87) PCT Pub. No.: WO2009/141971
PCT Pub. Date: Nov. 26, 2009

(65) Prior Publication Data
US 2011/0102458 A1   May 5, 2011

(30) Foreign Application Priority Data
May 19, 2008   (JP) .................... 2008-130758

(51) Int. Cl.
*G09G 5/00* (2006.01)
(52) U.S. Cl.
USPC ........................................................ 345/672
(58) Field of Classification Search
None
See application file for complete search history.

(56) References Cited

U.S. PATENT DOCUMENTS

| 7,562,085 | B2 * | 7/2009 | Bier et al. ............................. 1/1 |
| 7,636,898 | B2 * | 12/2009 | Takahashi ..................... 715/769 |
| 7,720,859 | B2 * | 5/2010 | Wakazono ..................... 707/769 |
| 8,111,244 | B2 * | 2/2012 | Lee et al. ...................... 345/173 |
| 2005/0066292 | A1 | 3/2005 | Harrington |

(Continued)

FOREIGN PATENT DOCUMENTS

| JP | 5-165595 A | 7/1993 |
| JP | 2005-269011 A | 9/2005 |

(Continued)

OTHER PUBLICATIONS

About drag and drop, URL: http://web.archive.org/web/20070322181206/http://www.kuraemon.com/support/otasuke/dragdrop_toha.html, 2007, last accessed Aug. 23, 2012.

(Continued)

*Primary Examiner* — Kee M Tung
*Assistant Examiner* — Haixia Du
(74) *Attorney, Agent, or Firm* — Canon U.S.A., Inc., IP Division

(57) ABSTRACT

A content managing device is provided, which can allow a user to intuitively perform generation of, using an operation that is similar to an operation of sorting content items or to an operation of adding attribute information to content items, a new sort-destination region into which content items are to be sorted. A first display object indicating a content item and a region in which the first display object is to be stored are displayed on a display unit. A position to which the first display object is moved is determined. When the determined position is located in the region, the first display object is stored in the region. When the determined position is not located in the region, a new region is displayed at the position to which the first display object was moved, and the first display object is stored in the new region.

13 Claims, 17 Drawing Sheets

(56) References Cited

U.S. PATENT DOCUMENTS

| | | |
|---|---|---|
| 2005/0188326 A1 | 8/2005 | Ikeda |
| 2005/0210411 A1 | 9/2005 | Morita |
| 2009/0276701 A1* | 11/2009 | Nurmi .......................... 715/702 |

FOREIGN PATENT DOCUMENTS

| | | |
|---|---|---|
| JP | 2005-276163 A | 10/2005 |
| JP | 2006-139505 A | 6/2006 |
| JP | 2007-310700 A | 11/2007 |
| JP | 2007328457 A | 12/2007 |
| JP | 2008027397 A | 2/2008 |
| JP | 2008035532 A | 2/2008 |

OTHER PUBLICATIONS

Fukagawa takeshi , PC Maintenance , Nikkei Personal Computing, Mar. 10, 2008.

* cited by examiner

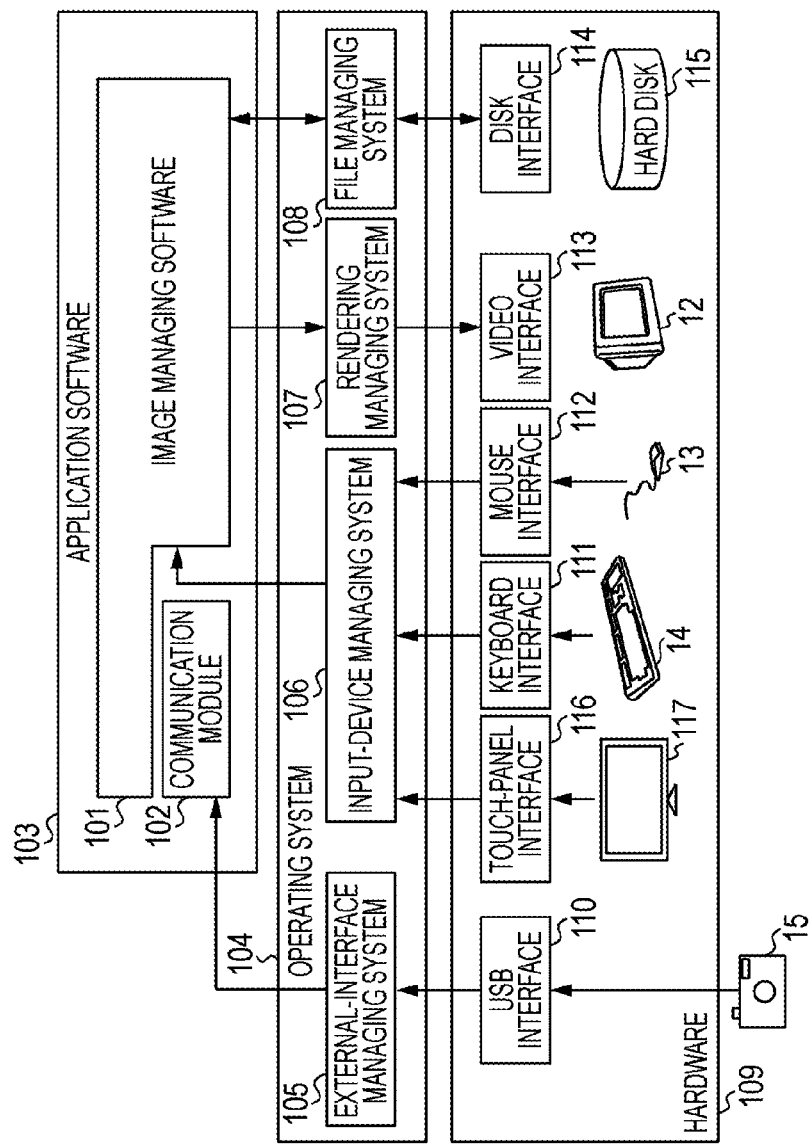

FIG. 5

| REGION ID | FOLDER PATH NAME | DISPLAY INFORMATION [(CENTER COORDINATES), RADIUS] | NUMBER OF IMAGES | POINTER TO IMAGE MANAGING TABLE |
|---|---|---|---|---|
| 0000 | My Pictures/20070707 | (600, 786), 224 | 23 | ● |
| 0001 | My Pictures/20070707/0001 | (230, 332), 147 | 12 | |
| 0002 | My Pictures/20070707/0002 | (593, 189), 147 | 24 | |
| 0003 | My Pictures/20070707/0003 | (968, 254), 147 | 1 | |

501

| IMAGE FILE NAME | DISPLAY LAYER | UPPER-LEFT COORDINATES | UPPER-RIGHT COORDINATES | LOWER-LEFT COORDINATES | LOWER-RIGHT COORDINATES |
|---|---|---|---|---|---|
| IMG_0326.JPG | 0001 | (596, 785) | (10, 662) | (616, 792) | (717, 737) |
| IMG_0327.JPG | 0002 | (526, 600) | (624, 633) | (504, 685) | (609, 710) |
| ---- | ---- | ---- | ---- | ---- | ---- |
| IMG_0468.JPG | 023 | (497, 798) | (598, 761) | (526, 861) | (626, 833) |

502

Prior Art

CONTENT MANAGING DEVICE AND CONTENT MANAGING METHOD

TECHNICAL FIELD

The present invention relates to a content managing device for displaying and managing content items, a content managing method, a program for causing a computer to perform the content managing method, and a recording medium on which the program is recorded.

BACKGROUND ART

In a content managing device of the related art, a large number of digital content items are sorted and managed using methods such as a method in which the digital content items are stored at specified storage places in a state in which the digital content items are sorted into groups, a method in which additional information is added to the digital content items, and a method in which a desired content item is searched using the additional information. For example, when an example in which the digital content items are images is described, the variety of operations that users can perform using images, such as an operation of viewing images that were picked up by digital cameras, an operation of editing the images, an operation of printing the images, and an operation of placing the images in the public on a network, has increased in accordance with the widespread use of digital cameras and networks. Because of increase in the variety of operations, the users pick up a large number of images, and save the images in personal computers or the like. Accordingly, the need to manage the large number of images has increased.

In a typical content managing device of the related art, files in which content items are saved are arranged and managed by using folders having a layer structure as units of sets. FIG. 15 shows an example of a display screen illustrating content management that is performed with the typical content managing device of the related art. Referring to FIG. 15, for example, a folder having a name of "Sea" is generated. An image of sea (one type of content item) is selected, and dragged and dropped into the folder. In this manner, files of images related to sea can be sorted into the folder having a name of "Sea". Furthermore, when it is desired to generate a new folder, a new empty folder is generated at first. Then, images that are desired to be sorted can be sorted into the folder by dragging and dropping. The sorted images can also be displayed in a sort-destination region corresponding to the folder.

For example, Japanese Patent Laid-Open No. 2005-276163 discloses that an image is displayed in a sort-destination region. A display format is disclosed in Japanese Patent Laid-Open No. 2005-276163. In the display format, there is a source view in which all images are displayed, and views corresponding to sort-destination regions are arranged at the upper side of the source view. A user selects an image from the source view, and drags and drops the image into one of the sort-destination regions (the views), thereby sorting the image. The dragged and dropped image is displayed in a small size in the view corresponding to the sort-destination region.

Furthermore, attribute information that can be utilized for a sorting task can be added to a sorted content item. FIG. 16 shows an example of a display screen in a case in which addition of attribute information to a content item is performed in the typical content managing device. A content item is selected, and properties are selected from the right-click menu, thereby a dialog box shown in FIG. 16 is displayed. Then, a keyword or a comment is input, whereby attribute information can be added to the content item.

Japanese Patent Laid-Open No. 5-165595 discloses that an operation of moving a tag to the side of cascaded pages of a document to add the tag to the document, thereby adding an identifier to the document.

However, in the related art, when it is desired to generate a new sort-destination region (for example, a folder), first, an operation needs to be performed to prepare an empty region. The operation that is performed to prepare an empty region is different from an operation that is performed to sort content items. For example, in Japanese Patent Laid-Open No. 2005-276163, when it is desired to generate a new view, it is necessary to generate an empty view by pressing a button that is provided at the side of the existing views. The operation of pressing a button to generate an empty view is different from an operation of dragging and dropping images to sort the images into views. Similarly, in the related art, an operation that is performed to prepare an empty region is different from an operation that is performed to add attribute information to content items. Accordingly, when a user sorts content items, the user needs to remember a large number of operations. Thus, a task of sorting content items with the content managing device is complicated and difficult particularly for a user who is not familiar with operations of a personal computer (PC) and who can only perform beginner-level operations.

Patent Citation 1: Japanese Patent Laid-Open No. 2005-276163
Patent Citation 2: Japanese Patent Laid-Open No. 5-165595

DISCLOSURE OF INVENTION

The present invention provides a content managing device that can allow a user to intuitively perform generation of, using an operation that is similar to an operation of sorting content items or to an operation of adding attribute information to content items, a new sort-destination region into which content items are to be sorted.

According to an aspect of the present invention, there is provided a content managing device including a display control unit configured to perform control of displaying, on a display unit, a first display object and a region in which the first display object is to be stored, the first display object indicating a content item; an instruction accepting unit configured to accept an instruction for moving the first display object on the display unit; a determination unit configured to determine a position to which the first display object is moved by the instruction accepting unit; and a control unit configured to perform, when it is determined by the determination unit that the position to which the first display object is moved is located in the region, control of storing the first display object in the region, and configured to perform, when it is determined by the determination unit that the position to which the first display object is moved is not located in the region, control of generating, at the position that is determined by the determination unit, a new region in which the first display object is to be stored, and control of storing the first display object in the new region.

In the aspect of the present invention, a new sort-destination region into which content items are to be sorted can be generated using an operation that is similar to an operation of sorting content items or to an operation of adding attribute information to content items. Thus, a user does not need to separately remember an operation of generating a new sort-destination region, and can intuitively perform a task of sorting content items.

This summary of the invention does not necessarily describe all necessary features so that the invention may also be a sub-combination of these described features. Further features of the present invention will become apparent from the following description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

FIG. 1B is a block diagram of the configuration of the personal computer system according to the first embodiment of the present invention.

FIG. 5 is an illustration of an example of a region managing table for managing a sort-source region and sort-destination regions in the first embodiment.

DESCRIPTION OF EMBODIMENTS

Exemplary embodiments of the present invention will be described below in detail with reference to the accompanying drawings.

In the embodiments given below, a configuration and operations of an image managing device for managing images, which is an example of a content managing device, will be described.

First Embodiment

Configuration of Hardware and Software

Figure 1A:
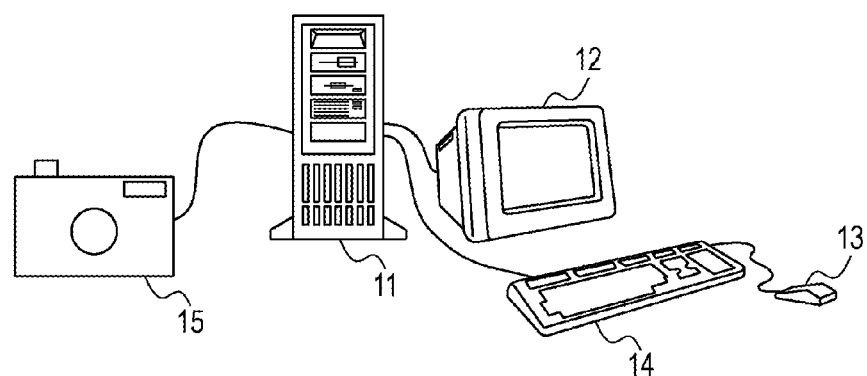
FIG. 1A is an illustration of an example of a configuration of a personal computer system according to a first embodiment of the present invention.

FIG. 1A shows an example of a configuration of a personal computer system that is a platform in a first embodiment of the present invention. Referring to FIG. 1A, a display 12, which is a display section that displays data, a mouse 13, which is a typical pointing device, and a keyboard 14 are connected to a computer system body (hereinafter, referred to as a "PC 11"). Furthermore, the PC 11 is connected to a digital camera 15 via a communication cable such as a universal serial bus (USB), and can send/receive image data to/from the digital camera 15.

FIG. 1B is a block diagram of the configuration of the personal computer system including software and hardware. Referring to FIG. 1B, the personal computer system includes hardware 109, an operating system (OS) 104, which operates on the hardware 109, and application software 103, which operates on the OS 104. Note that, among units constituting the hardware 109 and the OS 104, units are not immediately necessary for description of the embodiments of the present invention although being included as elements in the hardware 109 and the OS 104 are not illustrated. Examples of such units that are not illustrated include a central processing unit (CPU), a memory, and a read-only memory (ROM) that are included in the hardware 109, and a memory managing system that is included in the OS 104, and so forth. The CPU is a control unit that exercises control of the PC 11. The CPU accepts instructions from a user a via the mouse 13, the keyboard 14, or the like. In accordance with the instructions, the CPU executes various types of programs, which are given below, and performs display control for the display 12. Operating procedures of the CPU (for example, programs for a process of activating the PC 11, a basic input/output process, various processes given below in the embodiments of the present invention, and so forth) are recorded in the ROM or a hard disk 115. The operating procedures are loaded into the memory and performed by the CPU.

The hard disk 115 is a recording medium that records a file or data. A file managing system 108 is one element of the OS 104, and has a function of allowing the application software 103 to perform inputting/outputting of a file without noticing the existence of the hardware 109. A disk interface 114 allows the file managing system 108 to read/write a file or data from/into the hard disk 115. A rendering managing system 107 is one element of the OS 104, and has a function of allowing the application software 103 to perform rendering without noticing the existence of the hardware 109. A video interface 113 allows the rendering managing system 107 to perform rendering on the display 12. An input-device managing system 106 is one element of the OS 104, and has a function of allowing the application software 103 to receive an input from the user without noticing the existence of the hardware 109. A keyboard interface 111 allows the input-device managing system 106 to receive an input from the keyboard 14. A mouse interface 112 allows the input-device managing system 106 to receive an input from the mouse 13. A touch-panel interface 116 allows the input-device managing system 106 to receive an input from a touch panel 117. The digital camera 15 is connected to the PC 11 via a USB cable in the first embodiment. An external-interface managing system 105 manages the digital camera 15 via a USB interface 110. A communication module 102 communicates with the external-interface managing system 105. Image managing software 101 sends/receives image data, icon data, or the like to/from the digital camera 15 by using the communication module 102.

Outline of User Interface 1

An outline of a user interface in the first embodiment will be described below.

FIGS. 2A, 2B, 3, 4A and 4B show, as examples of a user interface of the PC 11 in the first embodiment, examples of display screens that are displayed on the display 12 by the image managing software 101. The image managing software 101 is stored in the ROM, the hard disk 115, or the like, and performed by the CPU.

Figure 2A:
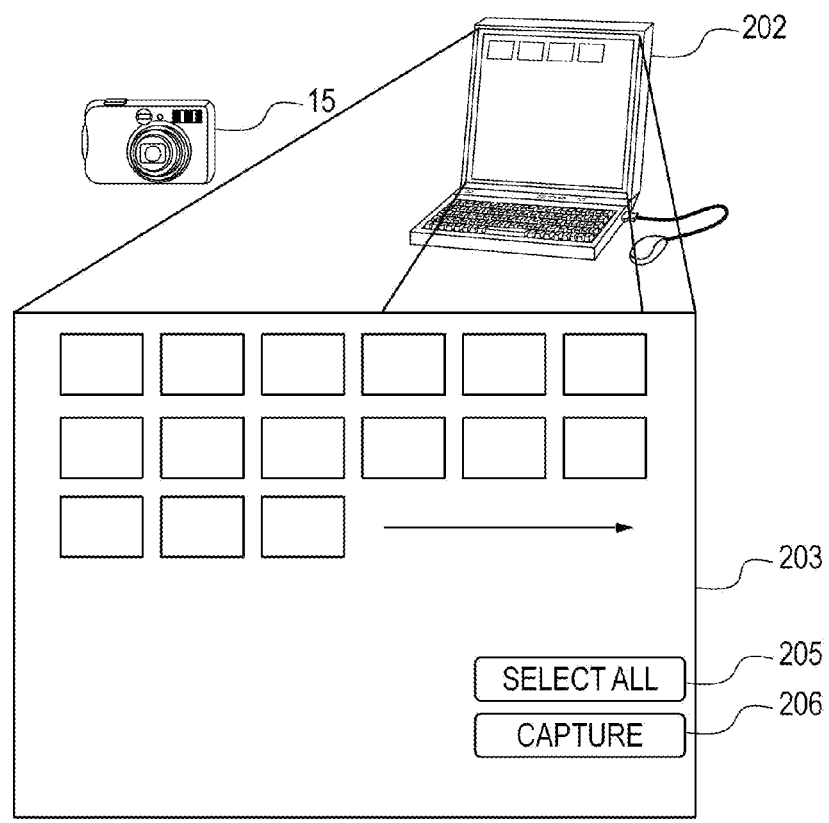
FIG. 2A is an illustration of an example of a display screen that is displayed on a PC 11 when images in a digital camera 15 are imported into the PC 11.
Figure 2B:
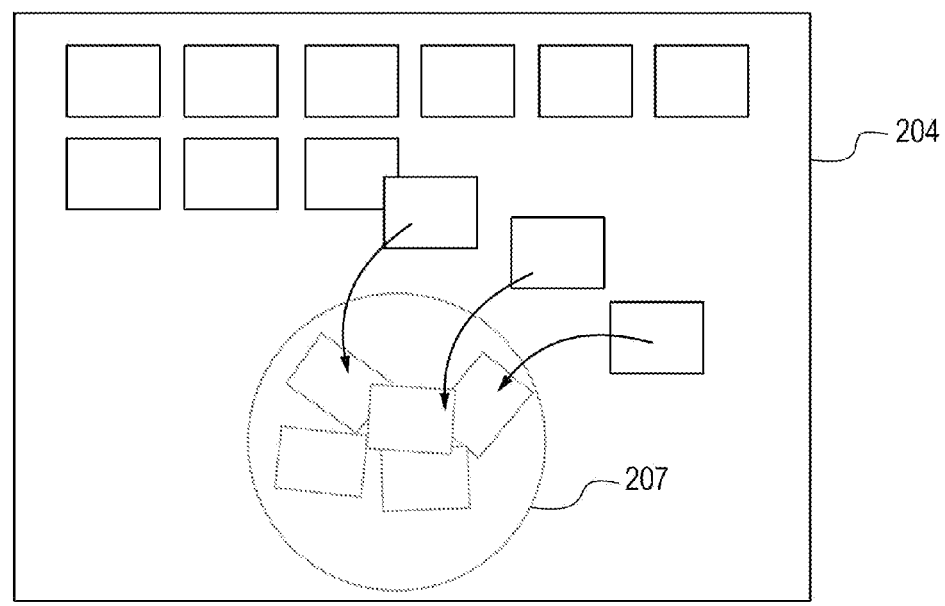
FIG. 2B is an illustration of an example of a display screen that is displayed on the PC 11 when images in the digital camera 15 are imported into the PC 11.

FIGS. 2A and 2B are illustrations of examples in which images are displayed before the images in the digital camera 15 are imported into the PC 11 and displayed in a region that is called a sort-source region. Connection of the digital camera 15 to the PC 11 is performed using a USB cable. The digital camera 15 is a typical digital camera that is recognized as a mass storage device when the digital camera 15 is connected to the PC 11. The user activates image import software. When a digital camera image (DCIM) folder that is provided under design rule for camera file system (DCF) standards exists in the root of a drive, the image import software causes the display 12 to display, on a display screen 202 of the display 12, thumbnail images corresponding to images that are saved in files which are included in the DCIM folder. An example is shown in FIG. 2A, in which the user interface for importing the images that are displayed on the display screen 202 and that exist in the digital camera 15 is displayed. The images that are recorded on a recording medium (such as a memory card) which is provided in the digital camera 15 are displayed in a window 203. The user can select, from among the images, an image to be imported. The user selects images by clicking the mouse 13 on the corresponding displayed thumbnail images, or selects all of the images by pressing an all-select button 205. When the user presses an import button 206, importing of the selected images starts.

A display screen in a case in which importing of the selected images is performed is shown in FIG. 2B. Regarding the images that are copied from the digital camera 15 to the PC 11, the thumbnail images corresponding to the images are automatically moved into a sort-source region 207. In this manner, the selected images are moved into the sort-source region 207 on the display screen.

Figure 3:
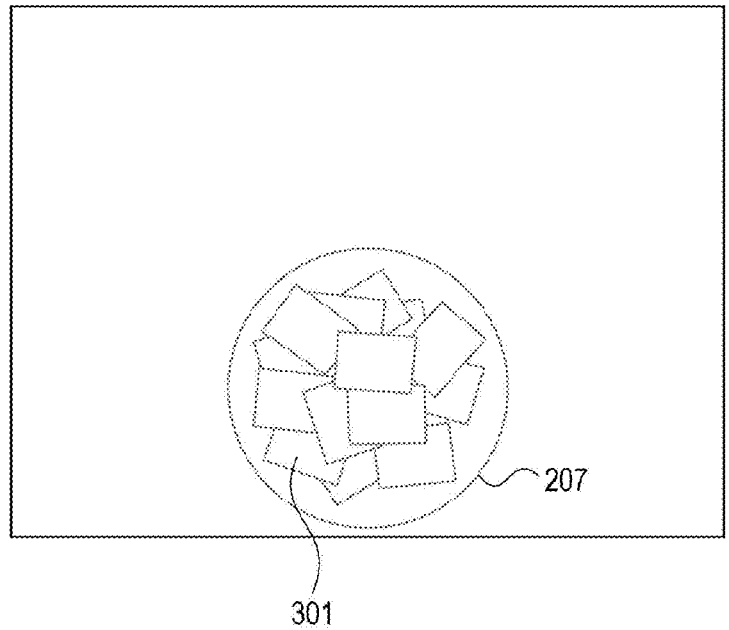
FIG. 3 is an illustration of an example of a display screen that is displayed on a display unit by image managing software 101 after the images in the digital camera 15 are imported into the PC 11.

FIG. 3 shows an example of a display screen that is displayed on the display 12 by the image managing software 101 after the images that exist in the digital camera 15 have been imported into the PC 11 as described above with reference to FIGS. 2A and 2B. The image managing software 101 may be software that is different from the image import software, or be the same as the image import software. An image 301 (a first display object) that is one of the thumbnail images corresponding to the images which have not been sorted by the user is displayed in the sort-source region 207 that is displayed so as to have a circular shape. The user selects the image 301, moves the image 301 into a sort-destination region, which is not illustrated in FIG. 3, and stores the image 301 in the sort-destination region. In this manner, the user can sort the images. The sort-destination region is a region that is used for grouping images. Images that are stored in each sort-destination region are sorted into one group. This indicates that the images form one set. Herein, a dragging and dropping operation is shown as one example of an operation of moving an image. Note that the images that are displayed in the sort-source region 207 are not limited to the above-described images that have been imported from the digital camera 15 into the PC 11 and that have not been sorted. Any image that the user desires to sort can be displayed in the sort-source region 207. An image that exists in a specific folder which is recorded in the hard disk 115 or all images that were picked up on a specific day may be displayed in the sort-source region 207.

Figure 4A:
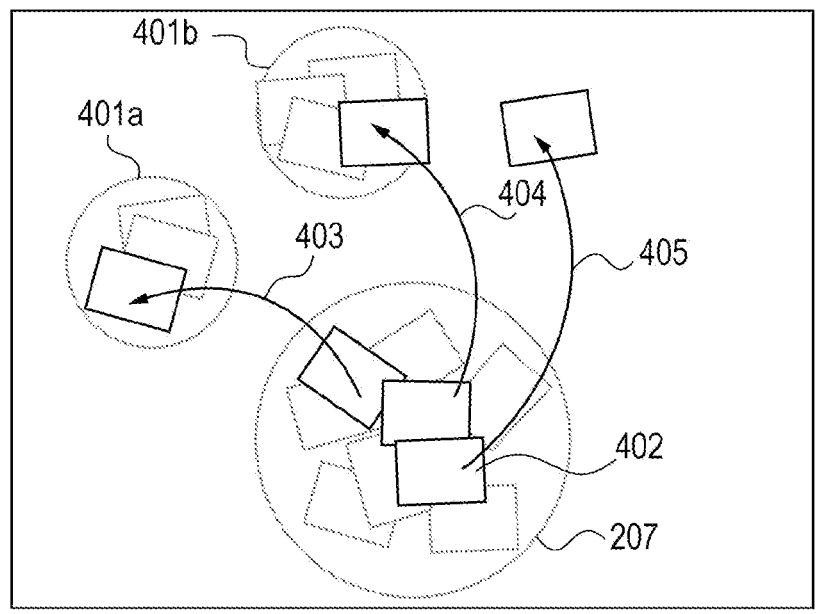
FIG. 4A is an illustration showing a user interface that is provided in an image sorting process in the first embodiment of the present invention.
Figure 4B:
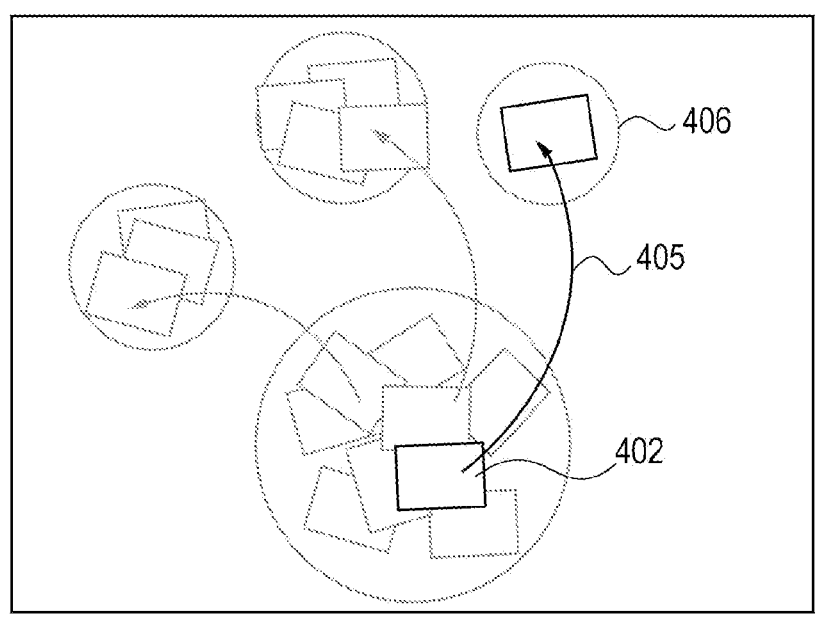
FIG. 4B is an illustration showing the user interface that is provided in the image sorting process in the first embodiment of the present invention.

FIGS. 4A and 4B are illustrations of display screens in a case in which the images are sorted from the sort-source region 207 into sort-destination regions. When sort-destination regions 401a and 401b already exist, the images are selected in the sort-source region 207, and dragged and dropped into the sort-destination regions 401a and 401b, whereby a sorting task can be performed. Images that are moved using the dragging and dropping operation are stored and displayed in a sort-destination region into which the images are moved. Also in a data structure, the images belong to a group that is defined in correspondence with the sort-destination region into which the images are moved, and this indicates that the images form one set. In the first embodiment, it is supposed that the sort-destination region (the group) corresponds to a folder which is prepared for the sort-destination region. Thus, by performing the dragging and dropping operation, the images that are displayed in the sort-source region 207 are saved in the sort-destination folders 401a and 401b. Arrows 403 and 404 shown in FIG. 4A indicate that the images are moved into the sort-destination regions 401a and 401b in this manner.

An arrow 405 shown in FIG. 4A indicates that an image 402 (the first display object) is selected (dragged) in the sort-source region 207, and that the image 402 is dropped into a place where no sort-destination region exists. In this case, a new sort-destination region to which the image 402 is to belong is automatically generated. The image 402 belongs to the generated sort-destination region. Supposing that a folder corresponds to a sort-destination region, a new folder corresponding to the new sort-destination region is automatically generated, and the image 402 is saved in the new folder. FIG. 4B shows an example in which a sort-destination region is automatically generated using an operation indicated by the arrow 405. As shown in FIG. 4B, new sort-destination region 406 is automatically generated at a position at which no sort-destination region exists as shown in FIG. 4A, and the image 402 is stored in the sort-destination region 406. As described above, because a new sort-destination region is generated simply using an operation of moving an image, the user can perform a task of sorting images without an effort to generate a new sort-destination region in advance. This allows the user to feel as if the user placed printed pictures over a desk and generated piles of pictures at arbitral places on the desk, thereby sorting the pictures. This also allows a user who is not familiar with operations using a computer to intuitively perform the task of sorting images.

Data Structure 1

A data structure for realizing the above-described user interface will be described.

FIG. 5 shows an example of a region managing table for managing data in sort-source regions and sort-destination regions, and an image managing table. A region managing table 501 includes the following fields:

a region identification (ID) for identifying a region;

a folder path name of a folder in which images that are sorted into the region is saved;

display information (center coordinates of the region, a radius of the region, and so forth) showing a position at which the region is displayed and so forth;

the number of images that are sorted into the region; and a pointer to an image managing table 502 for managing the images that are sorted into the region.

It is supposed that a region having a region ID of 0000 is the sort-source region 207 herein. Images that are displayed in the sort-source region 207 are images that are saved in a folder having a folder path name of My Pictures/20070707. The center coordinates of the sort-source region 207 (having a region ID of 0000) are (600, 786), and the sort-source region 207 is a circular region having a radius of 224 dots. The number of images that belong to the sort-source region 207 is 23 at this point. A pointer to the image managing table 502 is a pointer to the image managing table 502 for managing the images which belong to (are sorted into) the sort-source region 207. Herein, it is supposed that regions having region IDs which are equal to or larger than 0001 are sort-destination regions. Similarly, folder path names, display information, the number of images, and pointers to image managing tables 502 are managed using the region managing table 501.

Each of the image managing tables 502 is a table for managing images which are sorted into a sort-source region or a sort-destination region. For example, the image managing table 502 shown in FIG. 5 is used to manage the images that belong to the sort-source region 207 (having a region ID of 0000). Image file names of files of the images that belong to the sort-source region 207, display layers of the images, upper-left coordinates, upper-right coordinates, lower-left coordinates, and lower-right coordinates of display positions of the images are managed using the image managing table 502. For example, a file having an image file name of IMG_0326.JPG has a display layer of 0001, and the display layer of 0001 indicates that the file is displayed as the top. Because the images are displayed in such a manner that they are stacked as shown in FIGS. 3, 4A and 4B, positional relationships among the stacked images, such as images that are displayed in front of/behind an image, are managed using display layer numbers. By managing the upper-left coordinates, the upper-right coordinates, the lower-left coordinates, and the lower-right coordinates, the images are displayed in such a manner that they are arranged in a state in which they are randomly rotated in order to show the images being randomly piled up. If the images are only arranged along the horizontal direction, only the upper-left coordinates and the lower-right coordinates are necessary. However, since the images are rotated as described above, the coordinates of the four corners are managed. Although only the image managing table 502 for the sort-source region 207 (having a region ID of 0000) is shown in FIG. 5, also regarding the regions having region IDs which are equal to or larger than 0001, each of the image managing tables 502 exists for a corresponding one of the sort-destination regions.

Image Sorting Process

An example of an image sorting process in the first embodiment of the present invention will be described with reference to FIG. 6. The user interface that is described above with reference to FIGS. 2A, 2B, 3, 4A and 4B is realized using the image sorting process with the above-described region managing table 501 and the above-described image managing table 502 shown in FIG. 5. The CPU of the PC 11 reads a program of the image managing software 101 from the ROM or the like, loads the program into the memory, and executes the program, thereby realizing the image sorting process.

Figure 6:
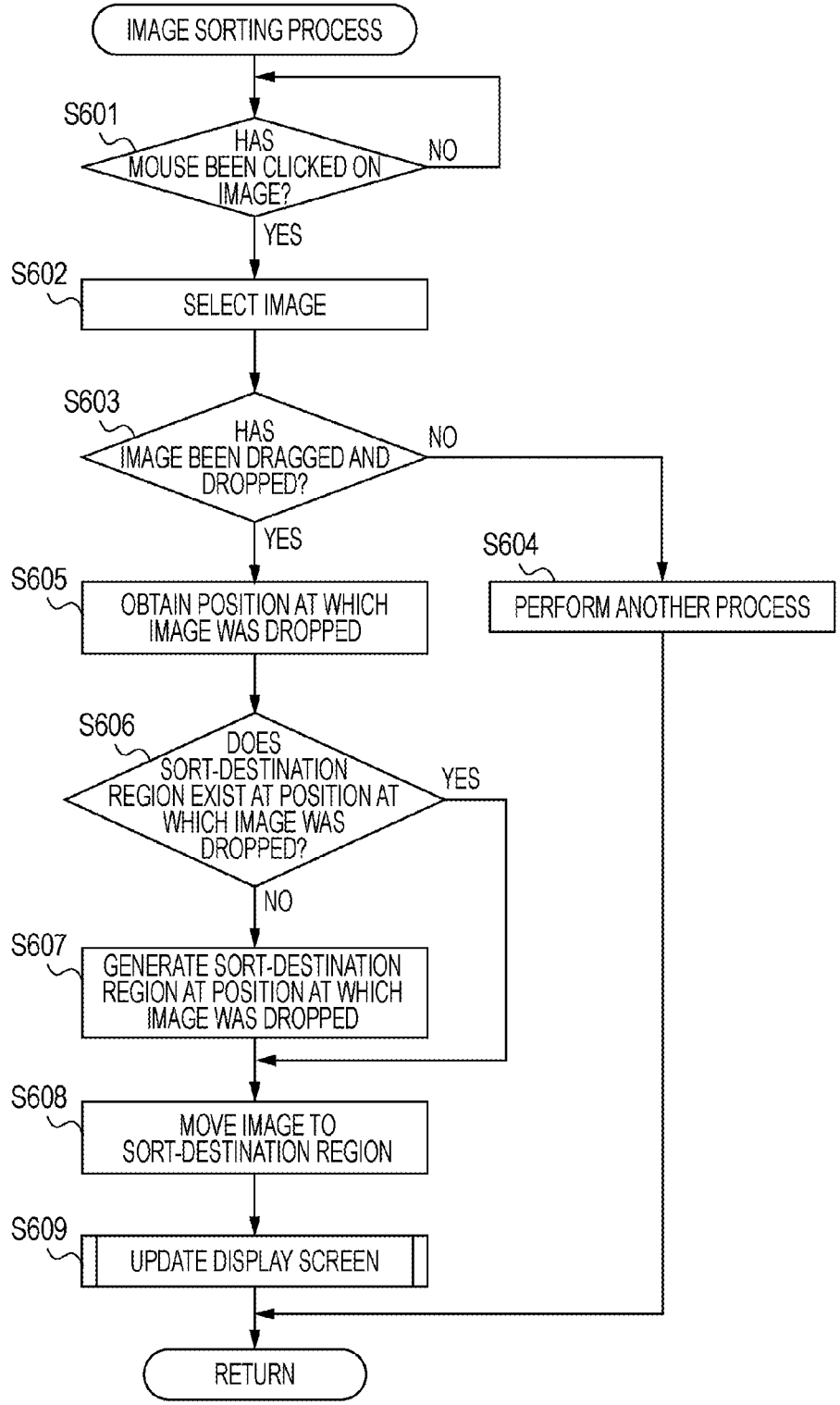
FIG. 6 is a flowchart of the image sorting process in the first embodiment of the present invention.

When the image managing software 101 in the first embodiment of the present invention is activated, first, the CPU (not illustrated) of the PC 11 displays a display screen of the image managing software 101 as shown in FIG. 3, and starts the image sorting process illustrated in FIG. 6.

In step S601, the CPU determines whether or not the user has clicked a mouse button of the mouse 13 on an image that is displayed on the display screen, and waits until the mouse button is clicked on an image. When it is determined that the mouse button has been clicked on an image, the CPU proceeds to step S602.

In step S602, the CPU determines which image is to be selected in accordance with the input performed by clicking the mouse button in step S601, and selects the determined image. More specifically, first, the CPU obtains a position at which a mouse cursor was located when the mouse button of the mouse 13 was clicked, and determines, with reference to the display information that is listed in the region managing table 501, which region includes the position at which the mouse cursor was located when the mouse button was clicked. The CPU compares the upper-left coordinates, upper-right coordinates, lower-left coordinates, and lower-right coordinates of each of the images, which are managed using the image managing table 502 for the determined region, with the position at which the mouse button was clicked, and determines which image includes the position at which the mouse cursor was located when the mouse button was clicked. In this case, on the display screen, the smaller the display layer number of an image in the image managing table 502, the nearer to the top the image is displayed. Accordingly, the CPU compares the position at which the mouse button was clicked with the coordinates of the images in the order of increasing the display layer number. In this manner, a displayed image can be correctly selected.

Then, in step S603, the CPU determines whether or not the image that is selected in step S602 has been dragged and dropped. The CPU determines that an operation that has been performed on the selected image is not the dragging and dropping operation, the CPU proceeds to step S604. In step S604, the CPU performs another process in accordance with the operation, and finishes the image sorting process. In contrast, when the CPU determines that an operation that has been performed on the selected image is the dragging and dropping operation, the CPU proceeds to step S605.

In step S605, the CPU obtains the position at which the mouse cursor was located when the image that was selected by dragging and dropping was dropped. When the CPU obtains the position at which the image was dropped, the CPU proceeds to step S606.

In step S606, the CPU determines whether or not a sort-source region or a sort-destination region exists at the position that is obtained in step S605. More particularly, the CPU determines, with reference to the display information that is listed in the region managing table 501, whether or not a sort-source region or a sort-destination region exists at the position at which the image was dropped. When a sort-source region or a sort-destination region exists at the position at which the image was dropped, the CPU proceeds to step S608. In contrast, when no sort-destination region or sort-source region exists at the position at which the image was dropped, the CPU proceeds to step S607.

In step S607, the CPU generates a new sort-destination region having center coordinates of the position at which the image was dropped and having a radius of a default value. Simultaneously, the CPU generates a new folder corresponding to the new sort-destination region.

Then, in step S608, the CPU moves (stores) the image into the region that is located at the position at which the image was dropped. Herein, when it is determined in step S606 that a sort-source region or a sort-destination region exists at the position at which the image was dropped, the CPU stores the image in the sort-source region or the sort-destination region that exists at the position at which the image was dropped. In contrast, when it is determined in step S606 that no sort-source region or sort-destination region exists at the position at which the image was dropped, the CPU moves (stores) the image into the new sort-destination region that is generated in step S607.

For example, a case is considered, in which a new sort-destination region having a region ID of 0003 is generated from a state in which the sort-destination region having a region ID of 0003 does not exist in the region managing table 501 shown in FIG. 5. In this case, in step S607, a new folder having a folder path name of My Pictures/20070707/0003 is generated, and a sort-destination region having a default radius of 147 dots is generated at center coordinates of (968, 254) of a display region, thereby generating the sort-destination region having a region ID of 0003. In step S608, the CPU moves (stores) the image into the generated sort-destination region having a region ID of 0003. Accordingly, the number of images in the sort-destination region having a region ID of 0003 becomes one. In this case, the image is removed from the image managing table 502 for the region to which the image belonged prior to being moved, and the image is added to the image managing table 502 for the region to which the image belongs after being moved. Furthermore, the file of the image is moved from the folder corresponding to the region to which the image belonged prior to being moved to the folder corresponding to the region to which the image belongs after being moved.

Then, in step S609, with a display update process, the CPU updates the display screen so that movement of the image is reflected in the display screen. The display update process will be described below with reference to FIG. 7. When the CPU updates the display screen, the CPU finishes the image sorting process.

Display Update Process

Figure 7:
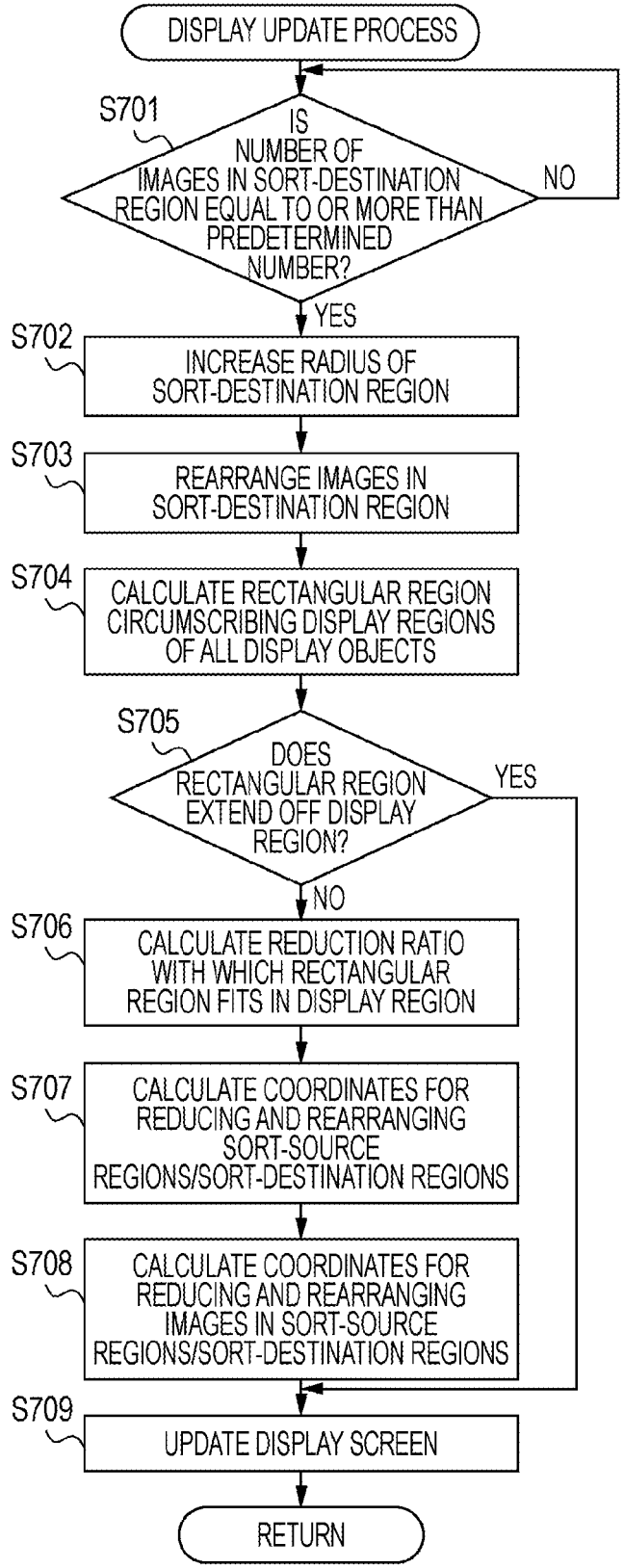
FIG. 7 is a flowchart of a display update process that is performed in the image sorting process in the first embodiment of the present invention.

The details of the display update process that is performed in step S609 shown in FIG. 6 are illustrated in FIG. 7.

When an increasing number of images are added in a sort-destination region because the images are moved, the size of the overlap among the images increases, and the number of images that are hidden increases. For this reason, in steps S701 to S703, a process is performed, in which the size of a sort-destination region is increased in accordance with an increase in the number of images in order to prevent the images which are displayed in the sort-destination region from overlapping one another as much as possible.

In step S701, the CPU determines whether or not the number of images in the sort-destination region becomes equal to or more than a predetermined number because the image is moved in step S608 shown in FIG. 6. In order to obtain the number of images in the sort-destination region, the field of the number of images that is listed in the region managing table 501 for the sort-destination region into which the image is moved is referred to. The predetermined number is a number that is set in advance in accordance with the display size of a sort-destination region. When the CPU determines that the number of images in the sort-destination region is not equal to or more than the predetermined number, the CPU proceeds to step S704. When the CPU determines that the number of images in the sort-destination region is equal to or more than the predetermined number, the CPU proceeds to step S702.

In step S702, the CPU determines an appropriate display size, for the sort-destination region in which the number of images is equal to or more than the predetermined number, among display sizes of sort-destination regions that are set in advance in accordance with the numbers of images. The CPU increases the value of the radius that is included in the display information which is listed in the region managing table 501.

In step S703, the CPU rearranges the images whose coordinates are listed in the image managing table 502 for the sort-destination region whose radius is increased in step S702 so that the images are prevented from overlapping one another as much as possible by utilizing an increased portion of the sort-destination region, and updates the coordinates of the images.

As described above, by performing the process in steps S701 to S703, a problem that it is difficult to see the images that are stored in the sort-destination region because the number of images is markedly increased as a result of movement of the image to the sort-destination region can be solved.

In the subsequent steps S704 to S708, a process is performed, in which, even when a new sort-destination region is generated or the size of the sort-destination region is changed in step S702 shown in FIG. 7 because the image is moved, automatic reduction is performed so that all sort-destination regions and images fit in the display region.

Figure 8A:
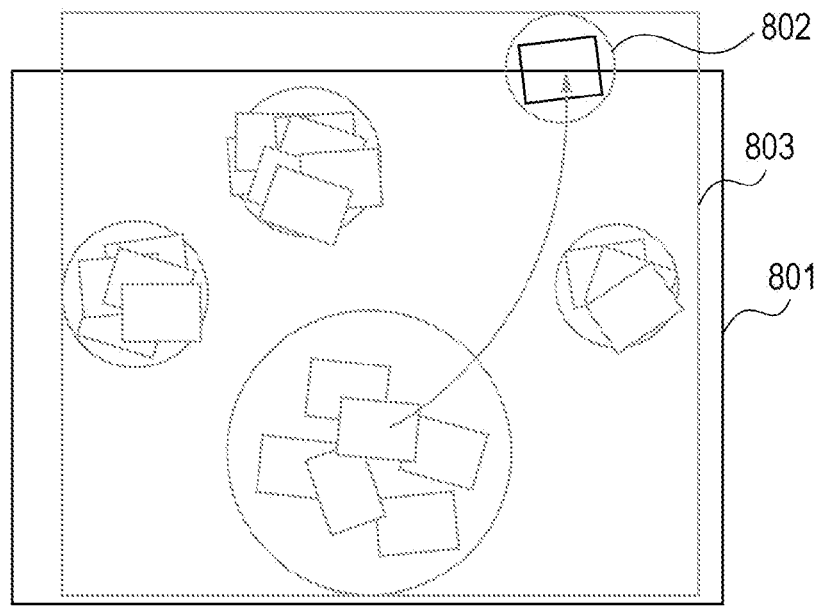
FIG. 8A is an illustration showing a change in display screen that is caused by performing the display update process in the first embodiment of the present invention.
Figure 8B:
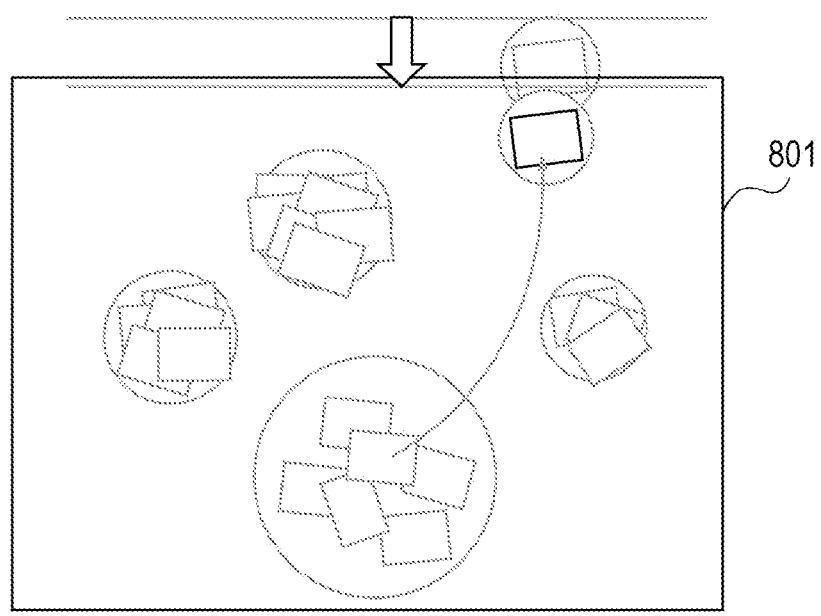
FIG. 8B is an illustration showing the change in display screen that is caused by performing the display update process in the first embodiment of the present invention.

FIGS. 8A and 8B illustrate a change in display screen that is caused by performing the process in steps S704 to S708. As shown in FIG. 8A, it is supposed that the user drags and drops an image into the vicinity of an edge of a display region 801. When no sort-destination region exists at the position at which the user dropped the image, a new sort-destination region 802 is automatically generated at the position. However, the sort-destination region 802 extends off the display region 801. A rectangle circumscribing all display objects that include the new sort-destination region 802 and that should be displayed is a rectangle 803, and the rectangle 803 extends off the display region 801 in the vertical direction. For this reason, the CPU calculates a reduction ratio with which the vertical length of the circumscribing rectangle 803 fits in the display region 801. The CPU reduces the entire display size with the reduction ratio, and displays a display screen. As a result, as shown in FIG. 8B, all of the display objects that should be displayed are displayed without extending off the display region 801. The flow of the process will be described below with reference to steps S704 to S708 shown in FIG. 7.

In step S704, the CPU calculates a rectangular region circumscribing display regions of all display objects, such as sort-source regions, sort-destination region, and images. More specifically, the CPU calculates display regions using the display information concerning all regions that are managed using the region managing table 501, and calculates a rectangle circumscribing the display regions (the rectangle 803 shown in FIG. 8A.

In step S705, the CPU determines whether or not the circumscribing rectangle 803, which is calculated in step S704, extends off the display region 801. When the rectangle 803 does not extend off the display region 801, the CPU proceeds to step S709. When the CPU determines that the rectangle 803 extends off the display region 801, the CPU proceeds to step S706.

In step S706, the CPU calculates a reduction ratio for reducing all of the display objects so the rectangle 803, which is calculated in step S704, fits in the display region 801 using the reduction ratio. In an example shown in FIGS. 8A and 8B, the reduction ratio is calculated as division of (the vertical length of the rectangle 803) by (the vertical length of the display region 801). In the subsequent step S707, the CPU calculates the coordinates of the sort-source regions and sort-destination regions that are reduced using the reduction ratio, and updates the display information that is listed in the region managing table 501. Furthermore, in step S708, the CPU calculates the coordinates of the respective images so that the images are reduced, and updates the respective coordinates that are listed in the image managing tables 502.

Finally, in step S709, the CPU updates the display screen in accordance with the updated region managing table 501 and the updated image managing tables 502, and finishes the display update process.

In step S701 in the first embodiment, an example is described, in which the number of images is used to determine whether or not increasing of the size of a sort-destination region is to be performed. However, when the sum of sizes of files of images exceeds a predetermined value, the CPU may determine whether or not increasing of the size of a sort-destination region is to be performed. In this manner, a sort-destination region can be displayed so that the sum of sizes of files of stored images can be visually recognized using the size of the sort-destination region.

Furthermore, the process in steps S704 to S708 may be applied not only to a case in which an image is moved, but also to, for example, a case in which a sort-destination region extends off the display region 801 because the entire sort-destination region is moved to an edge of the display region 801 of the display screen by dragging and dropping or the like.

Particular-Process Performing Process

Additionally, with the user interface in the first embodiment, an image is moved into a particular-process performing region on a display screen, whereby a particular process can be performed on the moved image.

Figure 9:
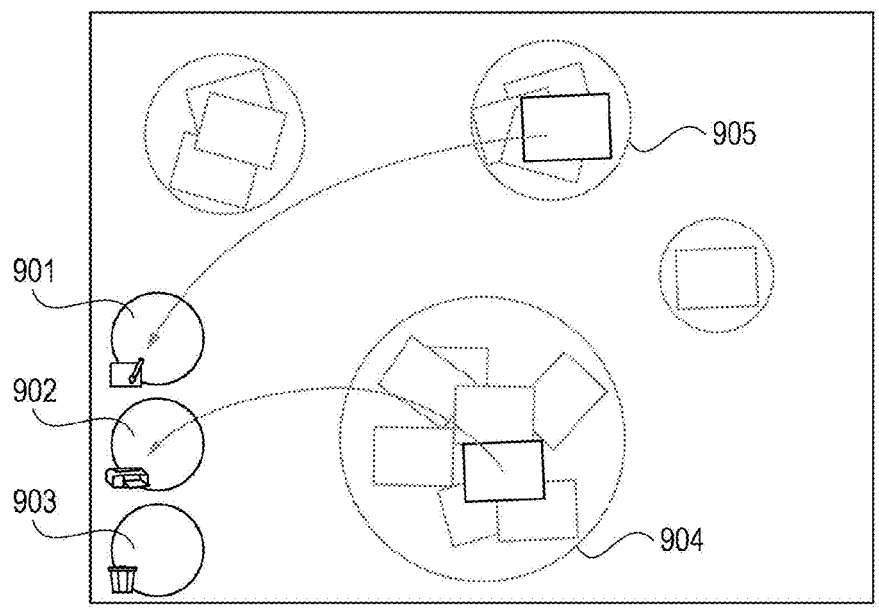
FIG. 9 is an illustration of an example of a display screen showing a user interface that is provided in a particular-process performing process in the first embodiment of the present invention.

FIG. 9 shows an example in which an image is moved into a particular-process performing region. A mail processing region 901 is a particular-process performing region, and an operation of moving an image into the mail processing region 901 is performed, whereby a mail sending process of sending the moved image by mail can be performed. A print region 902 is a particular-process performing region, and an operation of moving an image into the print region 902 is performed, whereby the moved image can be printed. A remove region 903 is a particular-process performing region, and an operation of moving an image into the remove region 903 is performed, whereby the moved image can be removed. An image is selected in a sort-source region 904 or a sort-destination region 905, and dragged and dropped into any one of the particular-process performing regions, whereby information concerning a path name of a folder in which the image is saved is passed to the particular-process performing region and a particular process is performed. When an image is dragged and dropped into the mail processing region 901 or the print region 902, the image does not disappear from the sort-source region 904 or the sort-destination region 905. However, because an image that is dragged and dropped into the remove region 903 is subjected to a removing process, the image is removed from the sort-source region 904 or the sort-destination region 905. Accordingly, in this case, the image is removed from the corresponding image managing table 502, and a display screen is updated. Thus, because sorting of an image and performance of a particular process on an image can be performed using the same operation, the user can easily both sort an image and perform a particular process on an image.

Figure 10:
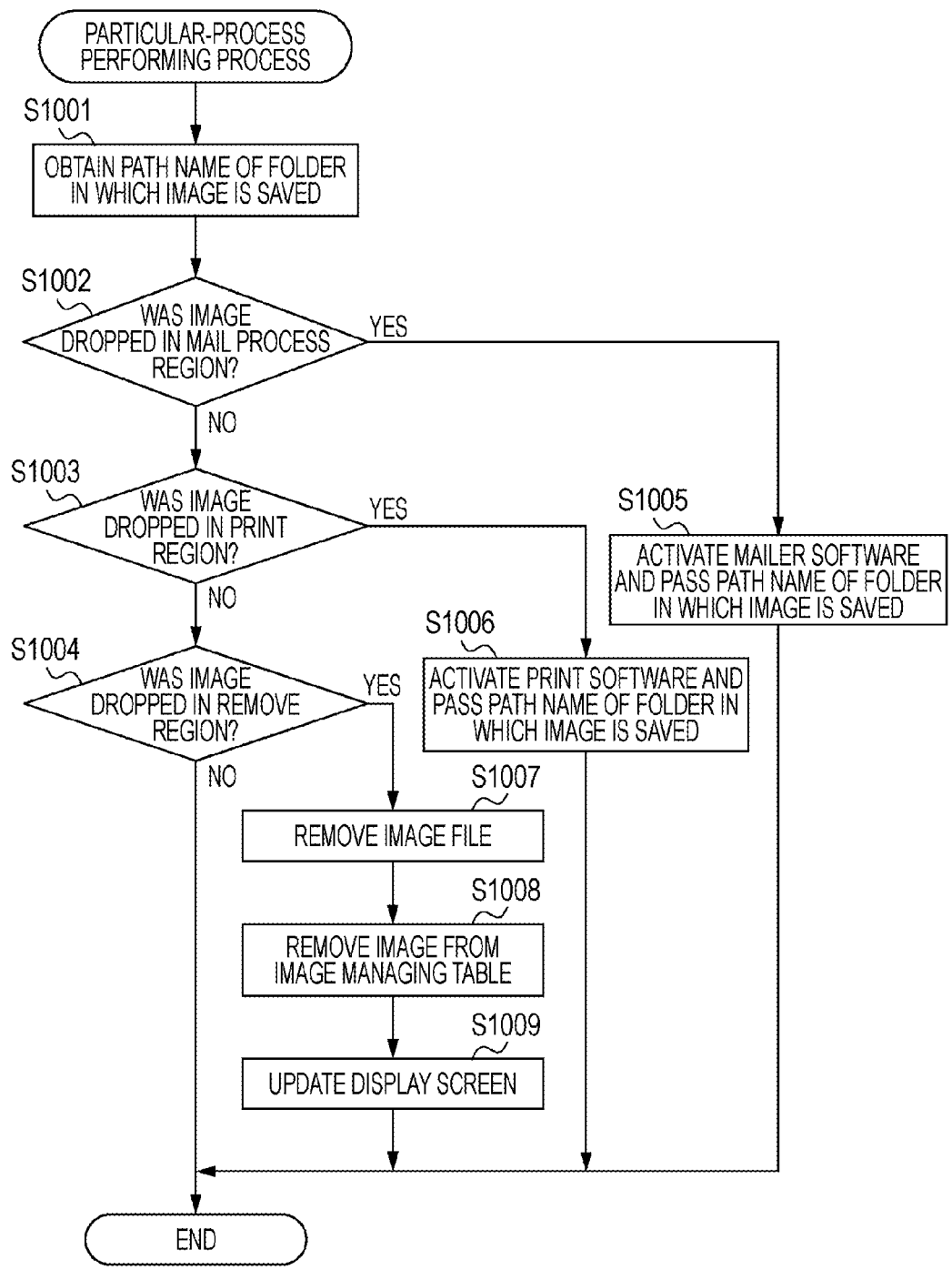
FIG. 10 is a flowchart of the particular-process performing process in the first embodiment of the present invention.

FIG. 10 shows a flowchart of the particular-process performing process of moving an image into any one of the particular-process performing regions.

When an image is dragged and dropped, a path name of a folder in which the image is saved is obtained in step S1001.

In step S1002, the CPU determines whether or not a position at which the image was dropped is located in the mail processing region 901. When it is determined that the position at which the image was dropped is located in the mail processing region 901, the CPU proceeds to step S1005. In step S1005, the CPU activates mailer software, and passes the path name of the folder in which the image is saved to the mailer software. In this manner, a process of sending the image by mail can be performed. When the CPU passes the path name of the folder in which the image is saved to the mailer software, the CPU finishes the particular-process performing process. When the CPU determines that the position at which the image was dropped is not located in the mail processing region 901, the CPU proceeds to step S1003.

In step S1003, the CPU determines whether or not the position at which the image was dropped is located in the print region 902. When the CPU determines that the position at which the image was dropped is located in the print region 902, in step S1006, the CPU activates printing software, and passes the path name of the folder in which the image is saved to the print software. In this manner, a printing process can be performed. When the CPU passes the path name of the folder in which the image is saved to the printing software, the CPU finishes the particular-process performing process. When the CPU determines that the position at which the image was dropped is not located in the print region 902, the CPU proceeds to step S1004.

In step S1004, the CPU determines whether or not the position at which the image was dropped is located in the remove region 903. When the CPU determines that the position at which the image was dropped is located in the remove region 903, in step S1007, the CPU removes the file of the dropped image. In step S1008, the CPU removes the image from the corresponding image managing table 502. In step S1009, the CPU updates a display screen, whereby the image that is displayed in a sort-source region or a sort-destination region disappears. In this manner, a removing process can be performed. When the CPU finishes the process in step S1004 or the process in step S1009, the CPU finishes the particular-process performing process.

In FIGS. 9 and 10, an example is described, in which images are moved to the particular-process performing regions in units of images. However, movement of images is not limited to movement in units of images. An entire sort-destination region may be moved (dragged and dropped) into any one of the particular-process performing regions. When an entire sort-destination region is moved into any one of the particular-process performing regions, a particular process can be simultaneously performed on all images that are sorted into the sort-destination region, and that are managed using the image managing table 502 for the sort-destination region.

Since images that are sorted into a sort-destination region can be simultaneously processed as described above, the user can easily sort, from a large number of images, a plurality of images that the user desires to process, and can simultaneously process the plurality of images.

According to the above-described first embodiment, sorting of an image using the image sorting process and generation of a new sort-destination region are performed using the same operation of dragging and dropping an image. The user grabs an image that the user desires to sort, and searches a sort-destination region into which the user desires to sort the image. When a sort-destination region into which the user desires to sort the image is founded, the user moves the image into the sort-destination region and drops the image, whereby the user can sort the image. When no sort-destination region into which the user desires to sort the image exists, the user drops the image at a place where no sort-destination region exists, whereby the user can generate a new sort-destination region and sort the image into the sort-destination region. Accordingly, the user does not need to remember an operation of generating a new sort-destination region separately from the operation of sorting an image. Furthermore, when images are to be sorted, an operation of preparing a sort-destination region in advance is not necessary. Thus, the user can efficiently and intuitively perform the task of sorting images. Additionally, when the task of sorting images is performed, the size of a sort-destination region tends to increase because generation of the sort-destination region can be easily performed. However, display of the sort-destination region is appropriately adjusted using the display update process, whereby increasing of the size of the sort-destination region or changing of a display size can be realized without user's uncomfortable feelings.

Second Embodiment

Outline of User Interface 2

In the first embodiment, an example is described, in which a new sort-destination region is automatically generated when no sort-destination region exists at a place to which an image is moved (at a position at which an image is dropped). With the image managing software 101 in a second embodiment of the present invention, a display object (a second display object), which is referred to as a "tag", is moved (dragged and dropped) into a sort-destination region to add the tag to the sort-destination region, whereby attribute information can be simultaneously added to a plurality of images that are sorted into the sort-destination region. Furthermore, in the second embodiment, an example will be described, in which, when a tag is moved and no sort-destination region exists at a place to which the tag is moved (at a position at which the tag is dropped), a new sort-destination region is generated.

Figure 11A:
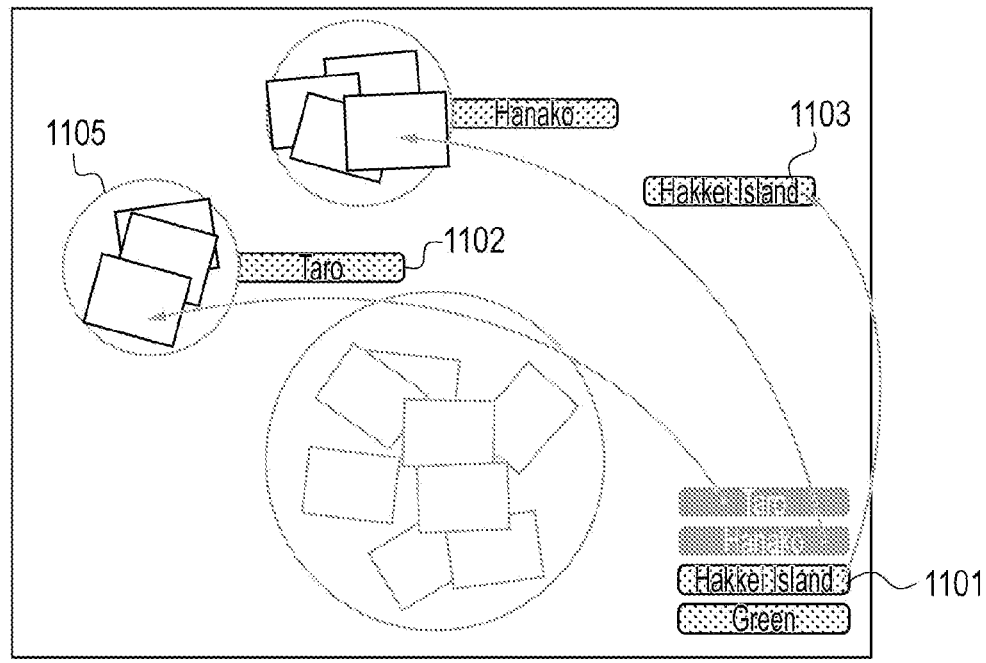
FIG. 11A is an illustration of an example of a display screen showing a user interface that is provided in a tag adding process in a second embodiment of the present invention.
Figure 11B:
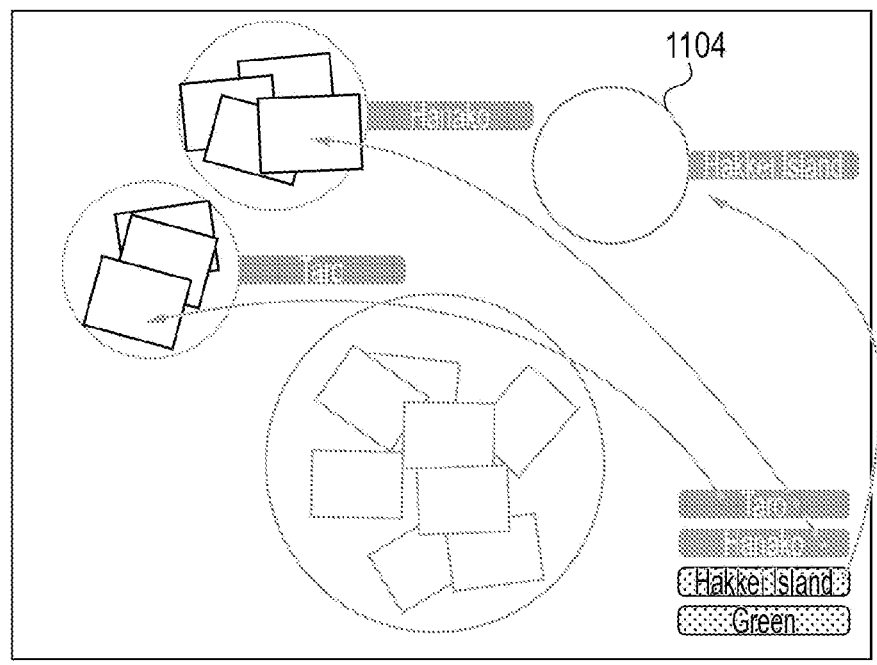
FIG. 11B is an illustration of an example of a display screen showing the user interface that is provided in the tag adding process in the second embodiment of the present invention.

FIGS. 11A and 11B show examples of display screens in a case in which an operation of moving and adding a tag to a sort-destination region by dragging and dropping is performed. A list of tags that can be added to a sort-destination region by dragging and dropping is displayed as a tag list 1101 shown in FIG. 11A. Examples of the tags include tags of personal names, such as "Taro" and "Hanako", and other types of tags, such as a tag of "Hakkei Island" and a tag of "Green". In addition, the user inputs a character string such as "Landscape" or "Party", whereby the user can add a tag. The user presses the mouse button on any one of the tags that are listed in the tag list 1101 to select the tag, and drags and drops the tag into a sort-destination region. In this manner, the tag can be added to the sort-destination region. FIG. 11A shows an example of a display screen illustrating a state in which a tag of Taro 1102 is added to a sort-destination region 1105. Attribute information of "Taro" is added to all images that are sorted into the sort-destination region 1105 to which the tag of Taro 1102 is added. Furthermore, the attribute information of "Taro" is to be also added to any image that is to be sorted into the sort-destination region 1105 after the tag of Taro 1102 is added. The attribute information may be a character string of "Taro" or be a code indicating "Taro". The character string or the code can be displayed as the attribute information concerning an image, and can be used as a tag character string for a search process.

In contrast, when no sort-destination region exists at a position to which the tag is moved by dragging and dropping, a new sort-destination region is generated at the position, and the moved tag is added to the generated sort-destination region. For example, as shown in FIG. 11A, the tag of Hakkei Island is dragged from the tag list 1101, and dropped at a position of a tag of Hakkei Island 1103 shown in FIG. 11A. In this case, because no sort-destination region exists at the position at which the tag of Hakkei Island was dropped, as shown in FIG. 11B, a new sort-destination region 1104 is automatically generated, and the tag of Hakkei Island is added to the sort-destination region 1104. The user can also drag and drop an image into the sort-destination region 1104, which is automatically generated and into which no image has been sorted, and an attribute of "Hakkei Island" is added to the sorted image.

Conversely, a tag is moved from a sort-destination region by dragging and dropping, whereby attribute information that is added to an image can be removed. For example, attribute information of "Taro" is added to images that are sorted into the sort-destination region 1105 shown in FIG. 11A. When an operation of removing the tag of Taro 1102 from the sort-destination region 1105 by dragging and dropping is performed, the attribute information of "Taro" is removed from the images that are sorted into the sort-destination region 1105.

Data Structure 2

Figure 12:
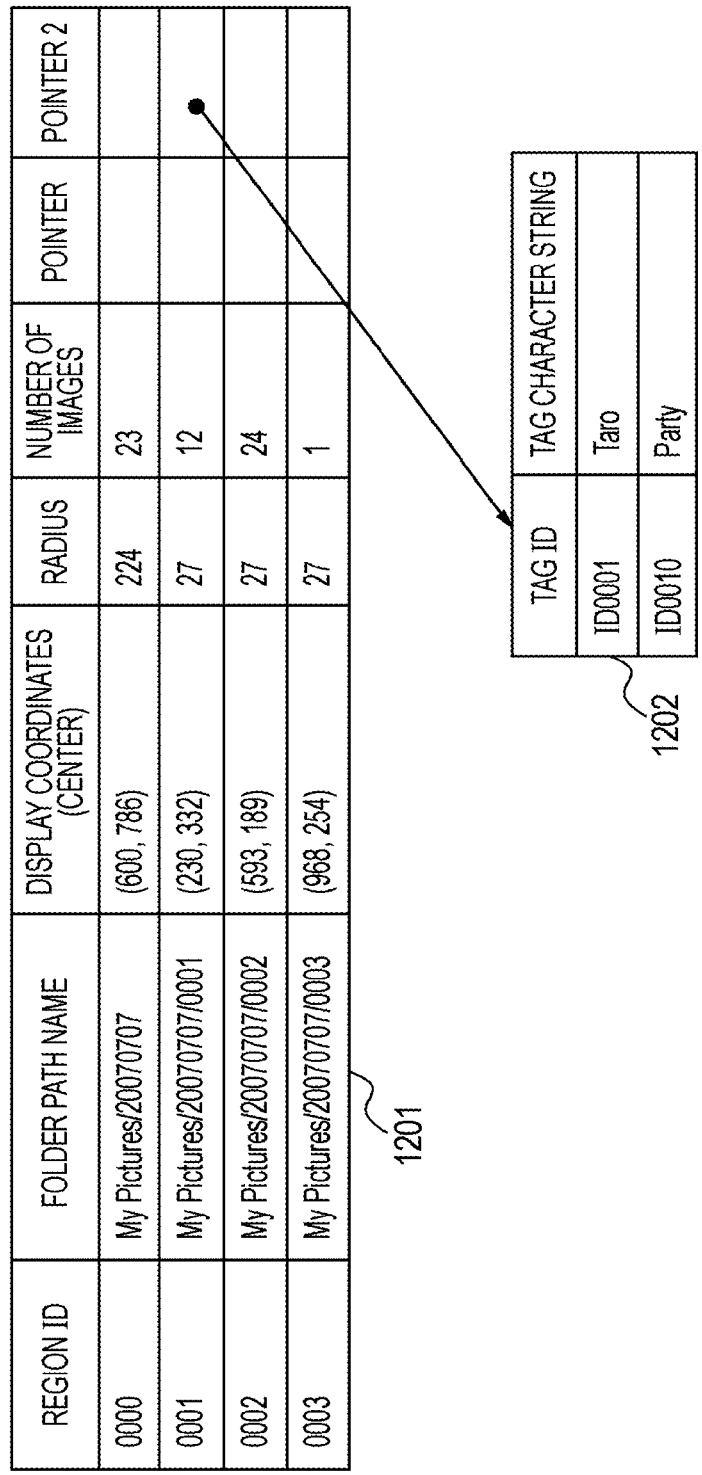
FIG. 12 is an illustration of an example of a region managing table for managing a sort-source region and sort-destination regions in the second embodiment.

FIG. 12 shows an example of a region managing table for realizing a user interface in the above-described second embodiment.

The field of a region ID, the field of a folder path name, the field of display information, the field of the number of images, and the field of a pointer to the image managing table 502 for the images in a region managing table 1201 are similar to those in the region managing table 501 shown in FIG. 5. The region managing table 1201 is different from the region managing table 501, which is described in the first embodiment, in that the region managing table 1201 has a field of a pointer to a tab managing table 1202. The pointer to the tab managing table 1202 is a pointer to the tab managing table 1202 for managing tags that are added to a region. For example, the tab managing table 1202 shown in FIG. 12 is used to manage tags that are added to a sort-destination region having a region ID of 0001. The tab managing table 1202 has a field of a tag ID of a tag and a field of a tag character string of the tag. The tab managing table 1202 shown in FIG. 12 indicates that two tags, i.e., a tag of Taro which has a tag ID of 0001 and a tag of Party which has a tag ID of 0010, are added to the sort-destination region having a region ID of 0001. In this case, an attribute of "Taro" and an attribute of "Party" are added to all images that are managed using the image managing table 502 for the sort-destination region having a region ID of 0001. Accordingly, when a plurality of tags are dropped into one sort-destination region, the plurality of tags can be added to the sort-destination region. In this case, the plurality of tags are arranged and displayed at an edge of a sort-destination region that is shown in FIGS. 11A and 11B.

Tag Adding Process

Figure 13:
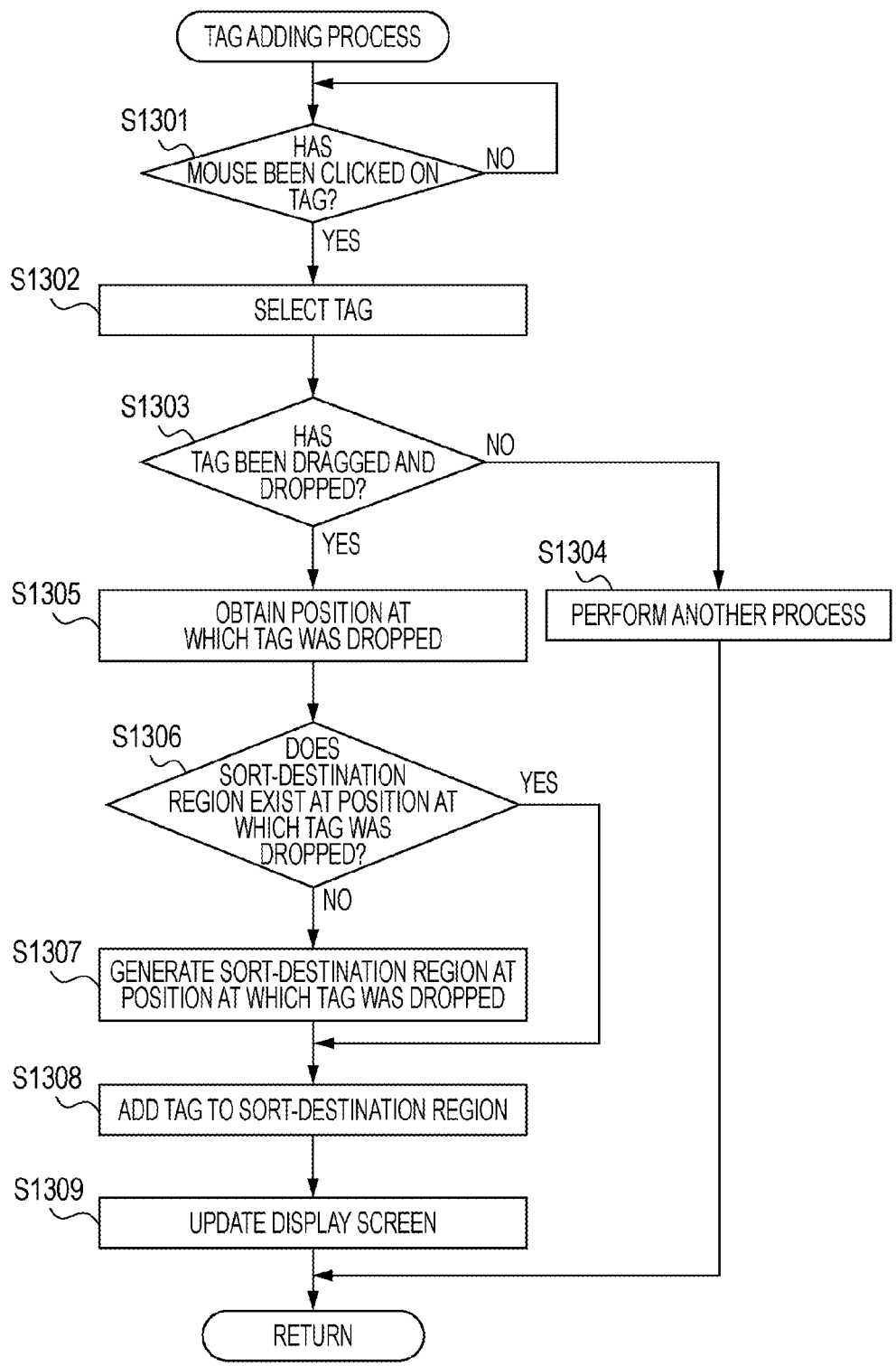
FIG. 13 is a flowchart of the tag adding process in the second embodiment of the present invention.

An example of a tag adding process in the second embodiment will be described with reference to FIG. 13. The user interface that is described above with reference to FIGS. 11A and 11B can be realized by performing the tag adding process using the above-described region managing table 1201 and the above-described tab managing table 1202 shown in FIG. 12. The CPU of the PC 11 reads a program of the image managing software 101 from the ROM or the like, loads the program into the memory, and executes the program, thereby realizing the tag adding process. Furthermore, the tag adding process is performed in parallel with the image sorting process that is illustrated in FIG. 6 in the first embodiment.

In step S1301, the CPU determines whether or not the mouse button of the mouse 13 has been pressed in a state in which the mouse cursor is placed by the user on a tag that is listed in the tag list 1101 or a tag that is already added to a sort-destination region or a sort-source region. The tag adding process is repeated until the mouse button is pressed in the state in which the mouse curser is placed on a tag. When the CPU determines that the mouse button has been pressed on a tag, the CPU proceeds to step S1302.

In step S1302, the tag that exists at a position at which the mouse curser was placed when the mouse button was pressed is selected.

In step S1303, the CPU determines whether or not the selected tag has been dragged and dropped. When the CPU determines that an operation which has been performed on the selected tag is not the dragging and dropping operation, the CPU proceeds to step S1304. In step S1304, the CPU performs another process in accordance with the operation, and finishes the tag adding process. In contrast, the CPU determines that an operation which has been performed on the selected tag is the dragging and dropping operation, the CPU proceeds to step S1305.

In step S1305, a position at which the selected tag was dropped is obtained.

In step S1306, the CPU determines whether or not the position at which the selected tag was dropped, which is obtained in step S1305, is located in any one of sort-destination regions or sort-source regions. The CPU performs determination with reference to display information that is listed in the region managing table 1201. When the position at which the tag was dropped is located in a sort-destination region or a sort-source region, the CPU proceeds to step S1308. When no sort-destination region or sort-source region exists at the position at which the tag was dropped, the CPU proceeds to step S1307.

In step S1307, the CPU generates a new sort-destination region having center coordinates of the position at which the image was dropped and having a radius of a default value. Simultaneously, the CPU generates a new folder corresponding to the new sort-destination region. This process is similar to the process of automatically generating a new sort-destination region in a case in which an image is moved, which is described in step S607 shown in FIG. 6.

Next, in step S1308, the tag is moved into (added to) the region that is located at the position at which the tag was dropped. When it is determined in step S1306 that a sort-source region or a sort-destination region exists at the position at which the tag was dropped, the tag is moved into the sort-source region or the sort-destination region that is located at the position at which the tag was dropped. When it is determined in step S1306 that no sort-source region or sort-destination region exists at the position at which the tag was dropped, the tag is moved into the new sort-destination region that is generated in step S1307. In this case, when the tag prior to being moved was not a tag that was displayed in the tag list 1101 but a tag that was displayed in a state in which it was added to any one of the regions, the tag is removed from the tab managing table 1202 for the region to which the tag was added prior to being moved. Attribute information indicated by the tag is also removed from images that are sorted into the region to which the tag was added prior to being moved. The tag is added to the tab managing table 1202 for the region to which the tag is added after being moved, and the attribute information indicated by the tag is added to images that are managed using the image managing table 502 to which the tag is added after being moved. The files of the images are moved from a folder corresponding to the region to which the tag was added prior to being moved to a folder corresponding to the region to which the tag is added after being moved. Note that, herein, addition of the attribute information may be performed by directly writing the attribute information in the files of the images, such as exchangeable image file format (Exit) information. Alternatively, addition of the attribute information may be performed by writing information showing the relationships between the images and the attribute information in other files other than the files of the images. Furthermore, addition of the attribute information to the images may be simultaneously performed with reference to the region managing table 1201, the image managing table 502, and the tab managing table 1202 at a later time, such as a time at which the image managing software 101 finishes, without being performed at this time.

Then, in step S1309, a display screen is updated in accordance with the region managing table 1201, the image managing table 502, and the tab managing table 1202, which are updated in step S1308. As in the case of the display update process that is described above with reference to FIG. 7, updating of the display screen involves performance of a process of increasing the size of a region in a case in which too many tags are added to the one region, and performance of a process of reducing the sizes of a display object in a case in which the display object extends off the display screen because a tag is added.

As described above, addition, management, and display of a tag can be performed.

Region Merge Process

With the image managing software in the second embodiment of the present invention, a sort-destination region is dragged and dropped into a different sort-destination region, whereby the sort-destination regions can be merged into one sort-destination region. When this merge operation is performed, a region managing table, an image managing table, and a tab managing table are updated so that images which belong to the respective sort-destination regions belong to the one sort-destination region which is obtained by merging. Furthermore, the region managing table, the image managing table, and the tab managing table are updated so that tags that are added to the respective sort-destination regions belong to the one sort-destination region which is obtained by merging.

Figure 14:
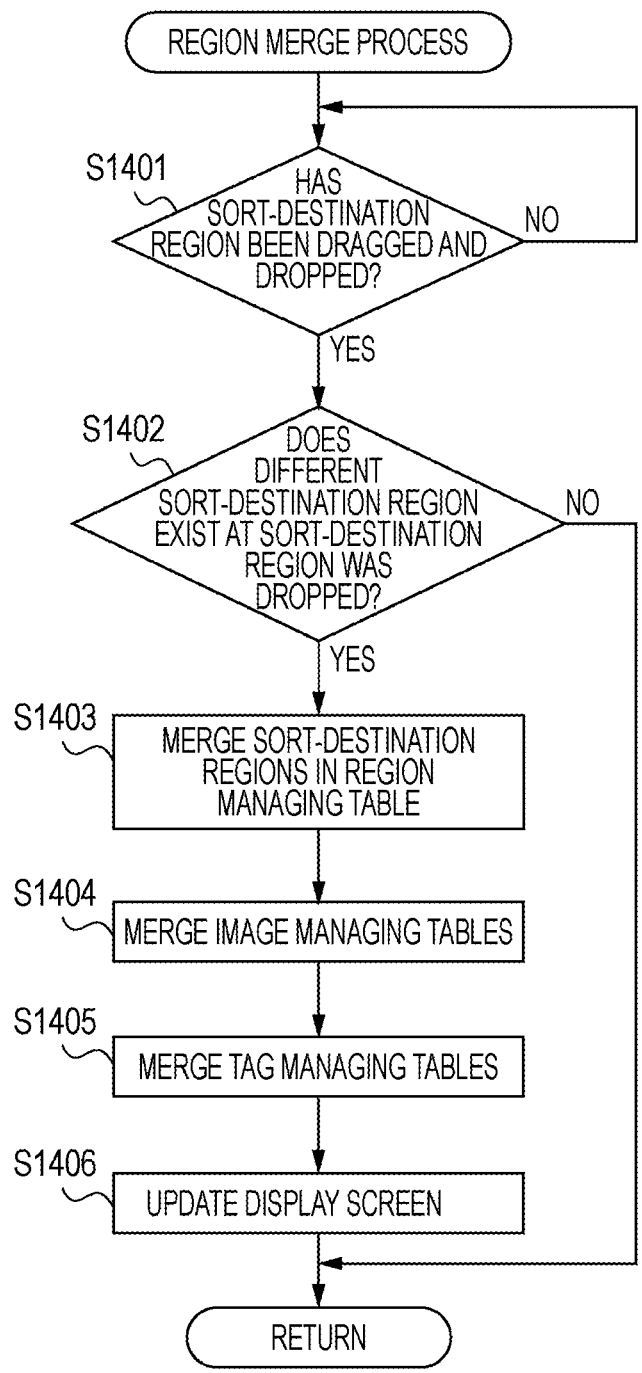
FIG. 14 is a flowchart of a region merge process in the second embodiment of the present invention.
Figure 15:
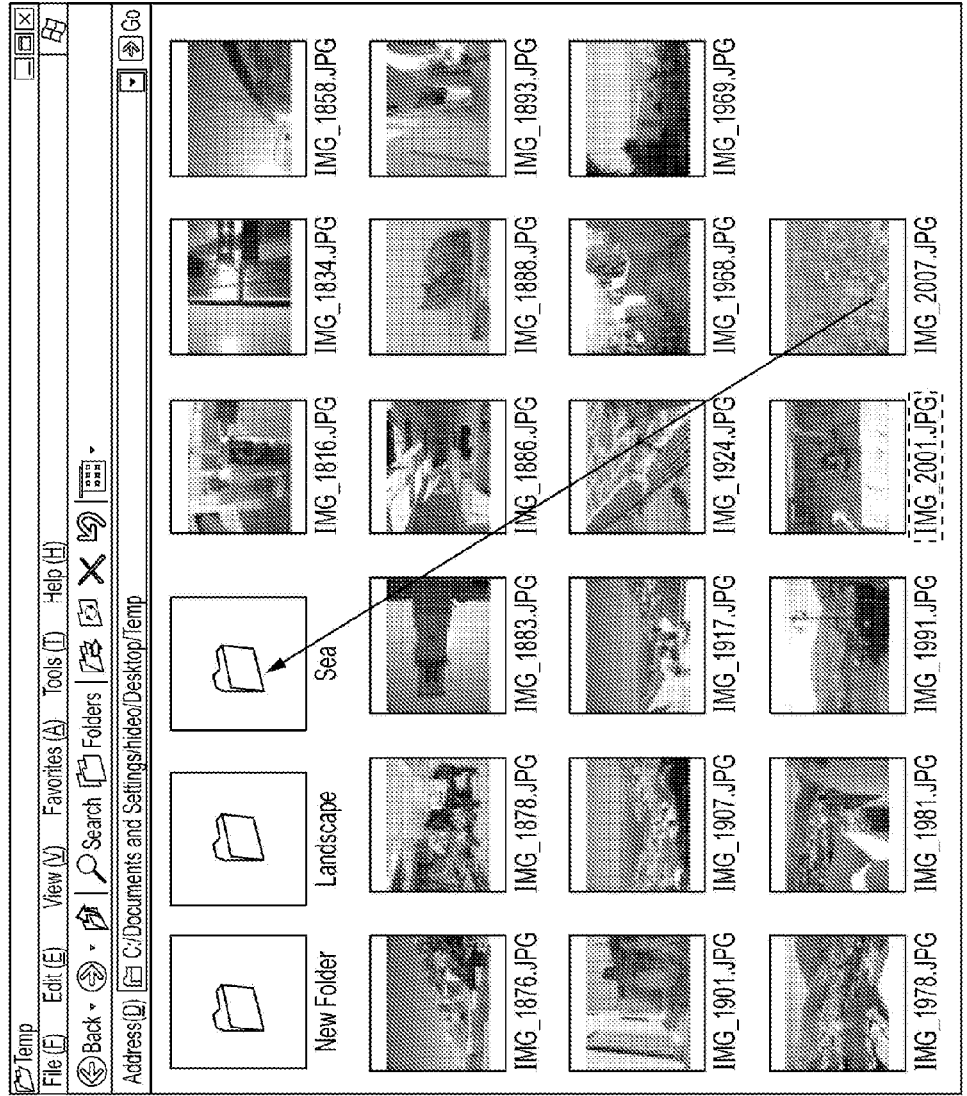
FIG. 15 is an illustration of an example of a display screen in a case in which content items are sorted using a typical content managing device of the related art.
Figure 16:
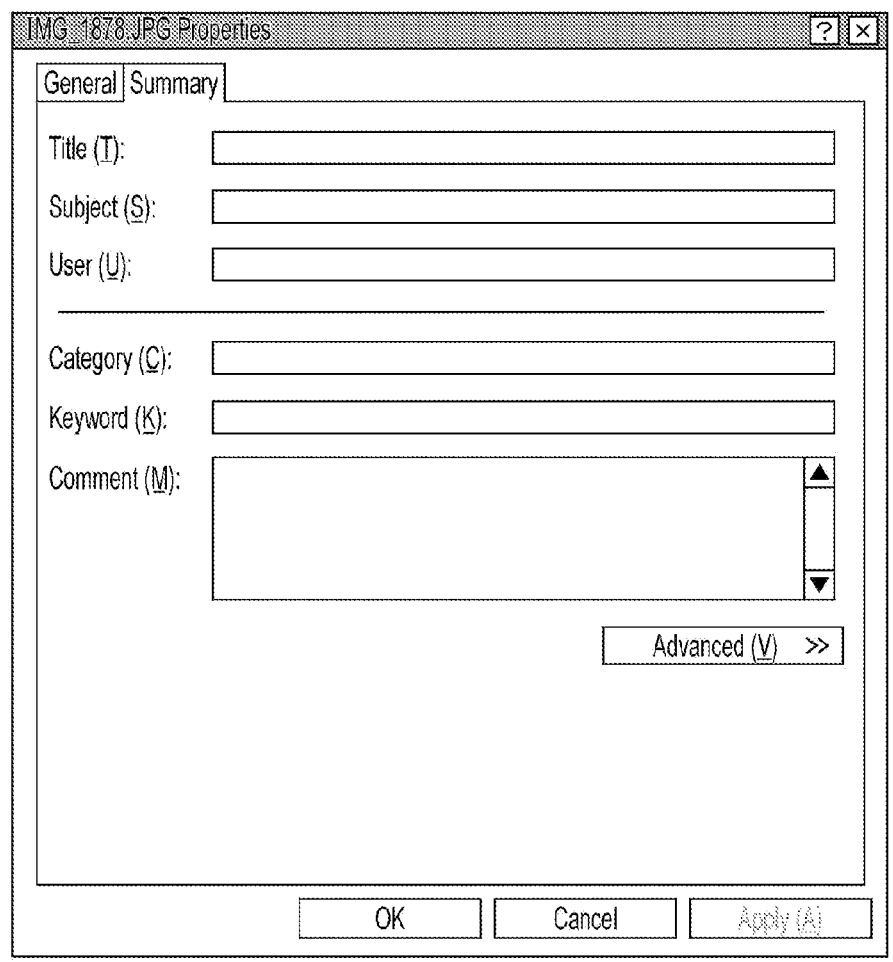
FIG. 16 is an illustration of an example of a display screen in a case in which an attribute is added to a content item using the typical content managing device of the related art.

FIG. 14 shows an example of a flowchart of the region merge process. The CPU of the PC 11 reads a program of the image managing software 101 from the ROM or the like, loads the program into the memory, and executes the program, thereby realizing the region merge process. The region merge process is performed in parallel with the image sorting process that is illustrated in FIG. 6 in the first embodiment.

In step S1401, the CPU determines whether or not a sort-destination region has been dragged and dropped using the dragging and dropping operation that is performed by the user. When the mouse cursor is placed at a position which is located in a sort-destination region and at which no thumbnail image of an image is placed, the mouse button is pressed at the position, thereby selecting the sort-destination region, and it is determined whether or not the sort-destination region is dragged and dropped in a state in which the sort-destination region is selected. When it is determined that no sort-destination region has been dragged and dropped, the CPU waits until the dragging and dropping operation is performed. When a sort-destination region is dragged and dropped, the CPU proceeds to step S1402.

In step S1402, the CPU determines whether or not a different sort-destination region exists at the position at which the sort-destination region was dropped. When no different sort-destination region exists at the position at which the sort-destination region was dropped, the CPU returns the dragged and dropped sort-destination region to the original display state, and finishes the region merge process. When the CPU determines that a different sort-destination region exists at the position at which the sort-destination region was dropped, the CPU proceeds to step S1403.

In step S1403, the CPU merges the dragged and dropped sort-destination region and the different sort-destination region, which exists at the position at which the sort-destination region was dropped, into one sort-destination region in the region managing table 1201. More specifically, the CPU moves files of images that are saved in folders having different folder path names so that the files are collected in a folder having a folder path name corresponding to a region ID of the different sort-destination region that is located at the position at which the sort-destination region was dropped. Display coordinates are reset in accordance with the sum of the numbers of images that are saved in the respective folders before the sort-destination regions are merged. This process is similar to the process in steps S701 to S703 shown in FIG. 7.

In the subsequent step S1404, the CPU merges the corresponding image managing tables 502, which are referred to with pointers to the image managing tables, into one.

Furthermore, in the subsequent step S1405, the CPU merges the corresponding tab managing tables 1202, which are referred to with pointers to the tab managing tables, into one.

Finally, in step S1405, a display screen is updated, whereby the one sort-destination region is displayed in a state in which the images that were stored in the respective sort-destination regions are stored in the one sort-destination region and in which tags that were added to in the respective sort-destination regions are added to the one sort-destination region.

In the above-described second embodiment, addition of an attribute to images using the image sorting process and generation of a new sort-destination region are performed using the same operation of dragging and dropping a tag. The user grabs a tag indicating attribute information that the user desires to simultaneously add to images which belong to a group, and searches a sort-destination region into which the images, to which the user desires to add the tag, are sorted. When a sort-destination region into which the images, to which the user desires to add the tag, are sorted is found, the user moves the tag to the sort-destination region, and drops the tag, whereby the user can add the tag to the sort-destination region. When no sort-destination region into which the images, to which the user desires to add the tag, are sorted exists, the user drops the tag at a place where no sort-destination region exists, whereby the user can generate a new sort-destination region and add the tag to the new sort-destination region. Accordingly, the user does not need to remember an operation of generating a new sort-destination region separately from the operation of adding a tag. Furthermore, when images are to be sorted, an operation of preparing a sort-destination region in advance is also not necessary. Thus, the user can intuitively perform the task of sorting images.

Note that, in addition to an instruction for performing a process of adding an attribute, provision of an instruction for simultaneously performing a process on images that are sorted into a sort-destination region and generation of a new sort-destination region may be performed using the same operation of dragging and dropping a tag. For example, a tag for providing an instruction for performing a process, such as a printing process, a transfer process, or a slide-show displaying process, is displayed. The tag is moved into a sort-destination region by dragging and dropping, whereby the process indicated by the tag can be simultaneously performed on images that are sorted into the sort-destination region. Furthermore, as in the case of the above-described second embodiment, when no sort-destination region exists at a position at which the tag was moved, a new sort-destination region is generated, and the tag is added to the new sort-destination region. Thus, more processes can be performed using the same operation, and the user can more easily and intuitively perform the operation.

Note that, in each of the above-described embodiments, an image that is stored in a sort-destination region can be moved into a different sort-destination region using the dragging and dropping operation. In this case, there is a case in which the number of images that are stored in the sort-destination region, from which the image is moved, becomes zero because the image is moved from the sort-destination region. When, as mentioned above, the number of images that are stored becomes zero in a sort-destination region, from which an image is moved, the sort-destination region may be automatically removed. More specifically, a field of the sort-destination region is removed from the region managing table 501, and a display object corresponding to the sort-destination region is removed. Thus, an operation of removing the sort-destination region can be omitted. Furthermore, too many sort-destination regions can be avoided. For example, even when a sort-destination region is generated because no sort-destination region exists at a position at which an image was dropped (step S606 shown in FIG. 6), there is a probability that a dropping operation is a misoperation. When the dropping operation is a misoperation, the user drags and drops the dropped image again to move the image into a different sort-destination region. In this case, because the sort-destination region that was automatically generated by dropping the image is automatically removed, the user does not need to perform, every time a sort-destination region is automatically generated, an operation of removing the sort-destination region.

Additionally, in each of the above-described embodiments, an example is described, in which an image that is stored in a sort-destination region is displayed in the sort-destination region. However, the image does not necessarily need to be displayed in the sort-destination region. In other words, although the image is stored in the sort-destination region in the data structure because the image is moved into the sort-destination region, the image may be only registered in the image managing table 502 for the sort-destination region in which the image is stored, and the image does not necessarily need to be displayed. This is similar to a case of a folder icon that is generally used. Accordingly, an image is dropped at a position at which no sort-destination region (no folder icon) exists, a field of a new sort-destination region is generated in the region managing table 501, and the dropped image is registered in the image managing table 502 for the new sort-destination region. On a display screen, the new sort-destination region is displayed at the position at which the image was dropped, and the dropped image disappears.

Note that, in each of the above-described embodiments, although an example in which the first display object to be sorted is an image is described, the first display object is not limited to an image, and any object to be sorted can be the first display object. For example, a sorting method according to an embodiment of the present invention may be applied to a case in which a content file, such as a document file or a music file, is the first display object.

Furthermore, the operation of moving a display object is not limited to the dragging and dropping operation using the mouse. Any other operation that can be intuitively recognized by the user as an operation of moving a display object into a sort-destination region may be used. For example, a dragging and dropping operation using the touch panel or the like, an operation of selecting "Cut" from the right-click menu and performing "Paste" in a sort-destination region, or the like may be used. Additionally, the present invention is not limited to application software on the PC. The present invention may be applied to any system having an appropriate display device/input device and having a function of sorting content items.

Note that, for the processes in each of the above-described embodiments, a storage medium on which a program code of software for embodying functions of the above-described embodiment is stored may be provided for a system or an apparatus. A computer (a CPU or a microprocessor unit (MPU)) of the system or the apparatus reads the program code that is stored on the storage medium, and executes the program code, whereby the functions of the above-described embodiment can be realized. In this case, because the program code that is read from the storage medium realizes the functions of the above-described embodiment, the storage medium on which the program code is stored constitutes the present invention. For example, a floppy (registered trademark) disk, a hard disk, an optical disc, a magneto-optical disc, or the like may be used as the storage medium for supplying the program code. Alternatively, a compact disc read-only memory (CD-ROM), a compact disc recordable (CD-R), a magnetic tape, a non-volatile memory card, a ROM, or the like may also be used.

Furthermore, although the functions of each of the above-described embodiments are realized by reading and executing the program code with the computer, an OS that operates on the computer or the like may practically perform some or all of processes in accordance with instructions of the program code, thereby also realizing the functions of the above-described embodiment through the processes.

Additionally, the program code that is read from the storage medium may be written into a memory that is provided on a functionally expanded board which is inserted into the computer, or that is provided in a functionally expanded unit which is connected to the computer. After that, a CPU that is provided on the functionally expanded board or in the functionally expanded unit or the like may practically perform some of or all of processes in accordance with the instructions of the program code, thereby also realizing the functions of each of the above-described embodiments through the processes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-130758, filed May 19, 2008, which is hereby incorporated by reference herein in its entirety.

The invention claimed is:

1. A content managing device comprising:
a display control unit configured to perform control of displaying, on a display unit, one or more display objects each indicating a content item and a plurality of regions each of which is a region for storing the one or more display objects, the one or more display objects including a first display object;
an instruction accepting unit configured to accept an instruction for moving the first display object on the display unit;
a determination unit configured to determine a position to which the first display object is moved by the instruction accepting unit; and
a control unit configured to perform, when it is determined by the determination unit that the position to which the first display object is moved is located in any of the plurality of regions, control of storing the first display object in the region, and configured to perform, when it is determined by the determination unit that the position to which the first display object is moved is not located in any of the plurality of regions, control of generating, at the position that is determined by the determination unit, a new region in which the first display object is to be stored, and control of storing the first display object in the new region,
wherein the dimensions of each of the plurality of regions are determined on the basis of the sum of sizes of content items corresponding to one or more display objects which are stored in each region or the sum of the numbers of one or more display objects which are stored in each region, and
wherein if a change in the dimensions of the region causes any of all the displayed plurality of regions, including regions other than the region with the changed dimensions, to be unable to fit in a display region, the display control unit displays all the displayed plurality of regions by reducing the size of all the displayed plurality of regions so that all the displayed plurality of regions fits in the display region.

2. The content managing device according to claim 1, wherein the display control unit further performs control of displaying a second display object for providing an instruction for performing a process on the content item corresponding to the first display object that is stored in the region,
wherein the instruction accepting unit further accepts an instruction for moving the second display object on the display unit,
wherein the determination unit determines a position to which the second display object is moved by the instruction accepting unit, and
wherein, when it is determined by the determination unit that the position to which the second display object is moved is located in the region, the control unit further performs control of moving the second display object into the region and control of performing the process on the content item corresponding to the first display object that is stored in the region, and, when it is determined by the determination unit that the position to which the second display object is moved is not located in the region, the control unit performs control of generating, at the position that is determined by the determination unit, a new region in which the first display object is to be stored, and control of moving the second display object to the new region.

3. The content managing device according to claim 2, wherein the process is a process of simultaneously adding attribute information to the content item corresponding to the first display object that is stored in the region, the instruction for performing the process being provided using the second display object.

4. The content managing device according to claim 2, wherein the process is a process of simultaneously performing at least one of a printing process, a sending process, and a slide-show displaying process on the content item corresponding to the first display object that is stored in the region, the instruction for performing the process being provided using the second display object.

5. The content managing device according to claim 2,
wherein the instruction accepting unit further accepts an instruction for moving the region on the display unit,
wherein, when the region includes regions and one of the regions is moved into a different region, the display control unit performs control of merging the one of the regions and the different region into one region, and control of displaying the one region, and
wherein the control unit performs control of adding, to the one region that is obtained by merging and that is displayed, the second display object that is added to the one of the regions and the second display object that is added to the different region.

6. The content managing device according to claim 1, wherein the display control unit sets a display size so that a rectangle circumscribing all regions which are displayed on the display unit fits in the display unit.

7. The content managing device according to claim 1,
wherein the display control unit further performs control of displaying a particular-process performing region for providing an instruction for performing a particular process on the content item corresponding to the first display object,
wherein the instruction accepting unit further accepts an instruction for moving the region on the display unit,
wherein the determination unit determines a position to which the region is moved by the instruction accepting unit, and
wherein, when it is determined by the determination unit that the position to which the region is moved is located in the particular-process performing region, the control unit further simultaneously performs the particular process on the content item corresponding to the first display object that is stored in the region.

8. The content managing device according to claim 7, wherein the particular process is at least one of printing, sending mail, and removing.

9. The content managing device according to claim 1, wherein the region is a region in which the stored first display object is able to be displayed.

10. The content managing device according to claim 1, wherein the content managing device further comprises a region managing unit configured to manage, as one set, the content item corresponding to the first display object that is stored in the region.

11. The content managing device according to claim 1,
wherein the instruction accepting unit further accepts an instruction for moving the region on the display unit,
wherein, when the region includes regions and one of the regions is moved into a different region, the display control unit performs control of merging the one of the regions and the different region into one region, and control of displaying the one region, and
wherein the control unit performs control of storing, in the one region that is obtained by merging and that is displayed, the first display object that is stored in the one of the regions and the first display object that is stored in the different region.

12. A content managing method comprising:
performing control of displaying, on a display unit, one or more display objects each indicating a content item and a plurality of regions each of which is a region for storing the one or more display objects, the one or more display objects including a first display object;
accepting an instruction for moving the first display object on the display unit;
determining a position to which the first display object is moved in the instruction accepting; and
performing, when it is determined in the determining that the position to which the first display object is moved is located in any of the plurality of regions, control of storing the first display object in the region, and, when it is determined in the determining that the position to which the first display object is moved is not located in any of the plurality of regions, control of generating a new region in which the first display object is to be stored at the position that is determined in the determining and control of storing the first display object in the new region,
wherein the dimensions of each of the plurality of regions are determined on the basis of the sum of sizes of content items corresponding to one or more display objects which are stored in each region or the sum of numbers of one or more display objects which are stored in each region, and
wherein if a change in the dimensions of the region causes any of all the displayed plurality of regions, including regions other than the region with the changed dimensions, to be unable to fit in a display region, performing control of displaying all the displayed plurality of regions by reducing the size of all the displayed plurality of regions so that all the displayed plurality of regions fits in the display region.

13. A non-transitory computer-readable recording medium on which a program is recorded, the program for causing a computer to function as:
a display control unit configured to perform control of displaying, on a display unit, a one or more display objects each indicating a content item and a plurality of regions each of which is a region for storing the one or more display objects, the one or more display objects including a first display object;
an instruction accepting unit configured to accept an instruction for moving the first display object on the display unit;
a determination unit configured to determine a position to which the first display object is moved by the instruction accepting unit; and
a control unit configured to perform, when it is determined by the determination unit that the position to which the first display object is moved is located in any of the plurality of regions, control of storing the first display object in the region, and configured to perform, when it is determined by the determination unit that the position to which the first display object is moved is not located in any of the plurality of regions, control of generating, at the position that is determined by the determination unit, a new region in which the first display object is to be stored, and control of storing the first display object in the new region, wherein the dimensions of each of the plurality of regions are determined on the basis of the sum of sizes of content items corresponding to one or more display objects which are stored in each region or the sum of numbers of the one or more display objects which are stored in each region, and wherein if a change in the dimensions of the region causes any of all the displayed plurality of regions, including regions other than the region with the changed dimensions, to be unable to fit in a display region, the display control unit displays all the displayed plurality of regions by reducing the size of all the displayed plurality of regions so that all the displayed plurality of regions fits in the display region.

* * * * *